(12) United States Patent
Cirillo et al.

(10) Patent No.: US 11,641,392 B2
(45) Date of Patent: May 2, 2023

(54) METHODS AND SYSTEMS FOR DE-CENTRALIZED DATA SHARING WITH ENFORCED DATA USAGE CONTROL FOR CROSS-PARTY DATA ANALYTICS

(71) Applicant: NEC Laboratories Europe GmbH, Heidelberg (DE)

(72) Inventors: Flavio Cirillo, Heidelberg (DE); Bin Cheng, Sandhausen (DE)

(73) Assignee: NEC CORPORATION, Tokyo (JP)

( * ) Notice: Subject to any disclaimer, the term of this patent is extended or adjusted under 35 U.S.C. 154(b) by 387 days.

(21) Appl. No.: 16/892,322

(22) Filed: Jun. 4, 2020

(65) Prior Publication Data

US 2021/0385268 A1 Dec. 9, 2021

(51) Int. Cl.
| | |
|---|---|
| *H04L 67/10* | (2022.01) |
| *H04L 41/0893* | (2022.01) |
| *G06F 9/48* | (2006.01) |
| *G06F 9/50* | (2006.01) |
| *H04L 9/40* | (2022.01) |

(52) U.S. Cl.
CPC ............ *H04L 67/10* (2013.01); *G06F 9/4881* (2013.01); *G06F 9/5066* (2013.01); *G06F 9/5072* (2013.01); *H04L 41/0893* (2013.01); *H04L 63/107* (2013.01)

(58) Field of Classification Search
CPC .............. H04L 67/10; H04L 41/0893; H04L 63/107; H04L 41/0894; G06F 9/4881; G06F 9/5066; G06F 9/5072; G06F 21/6245
See application file for complete search history.

(56) References Cited

U.S. PATENT DOCUMENTS

| | | | |
|---|---|---|---|
| 8,549,095 B2 | 10/2013 | Moore et al. | |
| 9,088,508 B1* | 7/2015 | Caputo, II | .......... H04L 63/1416 |
| 10,084,600 B1 | 9/2018 | Irwan et al. | |

(Continued)

FOREIGN PATENT DOCUMENTS

AU 2018220072 A1 3/2019

OTHER PUBLICATIONS

Elmer, Peter "Scaling Identity Based Access Control," Version 7, Check Point Software Technologies Ltd., Jan. 2019.

(Continued)

*Primary Examiner* — Michael A Keller
(74) *Attorney, Agent, or Firm* — Leydig, Voit & Mayer, Ltd.

(57) ABSTRACT

Systems and methods for controlling data usage in a distributed environment among multiple entity domains. A method include steps of: receiving, in a local entity domain, a data consuming application comprising or identifying at least a first analytics task, wherein the first analytics task processes data inputs to produce first output data; determining availability of the data inputs; interpreting data usage policies, or data control policies, to determine atomic actions to be executed, wherein at least one of the data usage policies indicates that one of the data inputs for the first analytics task must remain in a remote entity domain; and executing the atomic actions, wherein the atomic actions include dispatching the first analytics task to the remote entity domain for remote execution of the first analytics task and receiving the first output data of the first analytics task from the remote entity domain.

17 Claims, 20 Drawing Sheets

(56) References Cited

U.S. PATENT DOCUMENTS

| | | | |
|---|---|---|---|
| 10,296,258 B1 | 5/2019 | Richardson | |
| 10,878,403 B1* | 12/2020 | Zapata-Petrov | G06Q 20/223 |
| 10,986,516 B2* | 4/2021 | Dao | H04W 24/08 |
| 2017/0250877 A1* | 8/2017 | Seyvet | H04L 41/5009 |
| 2019/0327180 A1 | 10/2019 | Todd et al. | |
| 2020/0134467 A1* | 4/2020 | Dar | G06F 9/5033 |
| 2021/0187733 A1* | 6/2021 | Lee | G06N 20/00 |

OTHER PUBLICATIONS

Kelbert, Florian and Pretschner, Alexander, "Data Usage Control for Distributed Systems," ACM, Mar. 2018.

Kelbert, Florian and Pretschner, Alexander, "Data Usage Control Enforcement in Distributed Systems," ACM, CODASPY'13, Feb. 18-20, 2013.

Aiello, Maurizio et al. "IPPO: A Privacy-Aware Architecture for Decentralized Data-sharing," arXiv:2001.06420v1, Jan. 17, 2020.

Kellomäki, Sampo, "Securing Enterprise: Employability and HR Federation and XACML as Security and Access Control Layer," OASIS Open Standards Forum, Ditton Manor, Oct. 1, 2008.

Gholami, Ali, "Security and Privacy of Sensitive Data in Cloud Computing," Doctoral Thesis, KTH, Apr. 2016.

Pesonen, Lauri I.W. et al. "Encryption-Enforced Access Control in Dynamic Multi-Domain Publish/Subscribe Networks," ACM, DEBS '07, Jun. 20-22, 2007.

Phuttharak, Jurairat and Loke, Seng W., "A Review of Mobile Crowdsourcing Architectures and Challenges: Toward Crowd-Empowered Internet-of-Things," IEEEAccess, Jan. 4, 2019.

Alessi, M. et al. "A Decentralized Personal Data Store based on Ethereum: Towards GDPR Compliance," JCOMSS, Apr. 15, 2019.

Xiao, Yang et al. "PrivacyGuard: Enforcing Private Data Usage Control with Blockchain and Attested Off-chain Contract Execution," arXiv:1904.07275v2, Jul. 16, 2020.

Liono, Jonathan et al. "QDaS: Quality driven data summarisation for effective storage management in Internet of Things," J. Parallel Distrib. Comput. (2018). https://doi.org/10.1016/j.jpdc.2018.03.013. Dec. 2018.

* cited by examiner

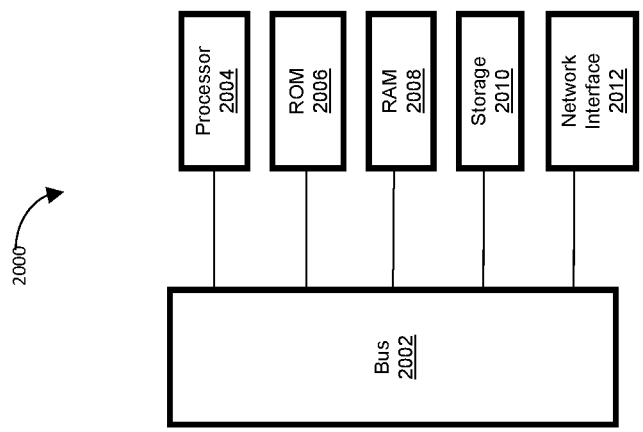

METHODS AND SYSTEMS FOR DE-CENTRALIZED DATA SHARING WITH ENFORCED DATA USAGE CONTROL FOR CROSS-PARTY DATA ANALYTICS

FIELD

Embodiments relate to data sharing systems and methods, and in particular methods and systems for de-centralized data sharing with enforced data usage control for cross-party data analytics.

BACKGROUND

Currently data providers are skeptical about sharing their data to data consumers due to the fear of losing control of their data. Even if a legal agreement is between among data the provider and the data consumer, enforcement of the agreement may happen only through costly and complicated legal proceedings. In some cases, the data consumer may not even be aware of breaking data usage policies and they might unwittingly face consequences. A typical case of the latter is the GDPR regulation.

In such a scenario, data providers are holding datasets that can be much more valuable, and might generate revenue, if the data is shared. From the other side, data consumers are in need of high-quality data to enable new services or improve their service quality.

SUMMARY

The present invention provides systems and method for controlling data usage in a distributed environment among multiple entity domains. A method embodiment includes steps of: receiving, in a local entity domain, a data consuming application comprising or identifying at least a first analytics task, wherein the first analytics task processes one or more data inputs to produce first output data; determining availability of the one or more data inputs; interpreting one or more data usage policies, or data control policies, to determine one or more atomic actions to be executed, wherein at least one of the data usage policies indicates that one of the data inputs for the first analytics task must remain in a remote entity domain; and executing the one or more atomic actions, wherein the one or more atomic actions include dispatching the first analytics task to the remote entity domain for remote execution of the first analytics task and receiving the first output data of the first analytics task from the remote entity domain.

BRIEF DESCRIPTION OF THE DRAWINGS

Embodiments of the present invention will be described in even greater detail below based on the exemplary figures. The invention is not limited to the exemplary embodiments. All features described and/or illustrated herein can be used alone or combined in different combinations in embodiments of the invention. The features and advantages of various embodiments will become apparent by reading the following detailed description with reference to the attached drawings which illustrate the following:

FIG. 20 is a block diagram of a processing system according to an embodiment.

DETAILED DESCRIPTION

Accordingly, it is desirable to provide improved systems and methods for sharing data, and particularly systems and methods for sharing data in a controlled fashion according to data access and data usage policies with distributed enforcement of such policies.

Figure 1:
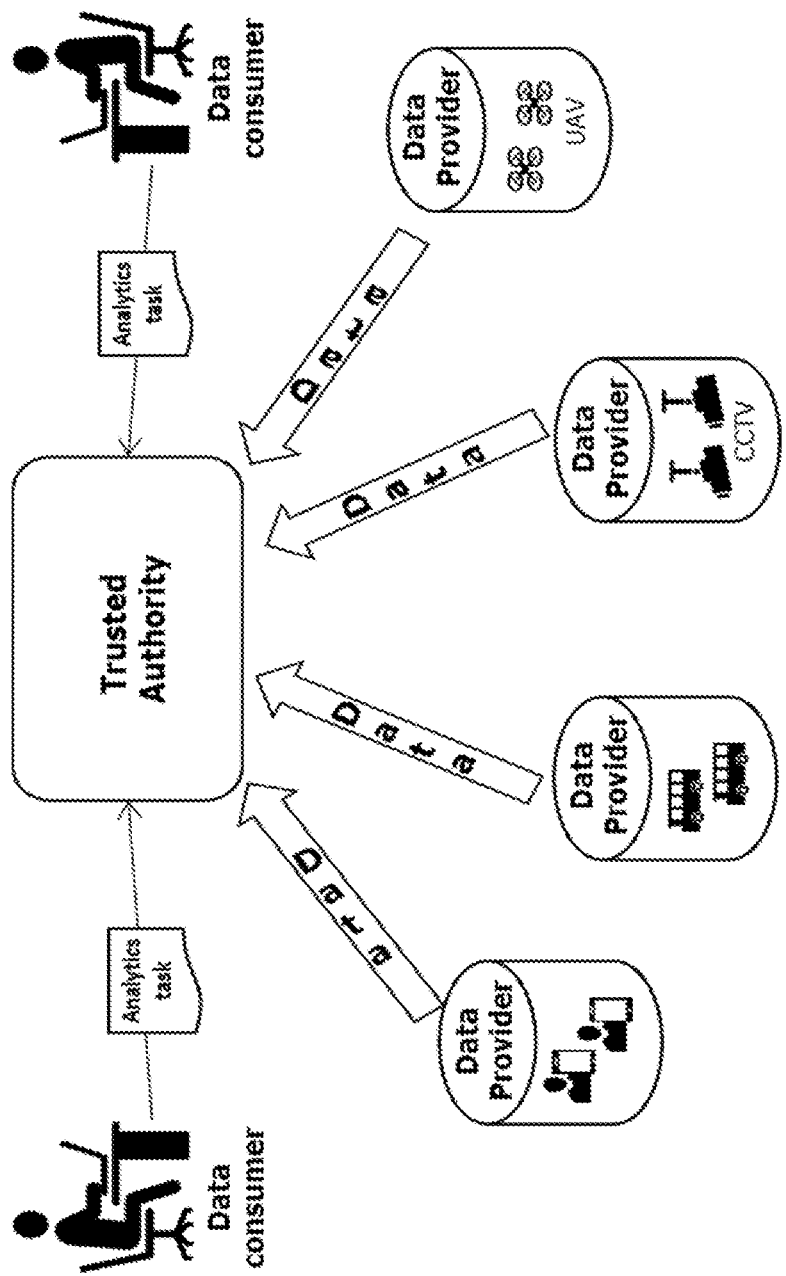
FIG. 1 depicts centralized data usage control using a trusted authority logically located between data consumers and data providers.

One solution includes a central authority trusted by all the parties that handles data and services as shown in FIG. 1, which depicts centralized data usage control using a single trusted authority logically located between data consumers and data providers. In some scenarios, a single authority may not be viable. As example, large companies may not be willing to hand over data control to a third party, but they would rather enter a closed trusted circuit.

Another example is the scenario of many parties such as smart cities where there may be a large number of entities, such as private or public companies, public institutions, private citizens, small enterprises, and academia desiring access to data. A single trusted authority may be feasible in the case of a single city administration but it may not be appropriate for many cities since that approach would not scale well.

Embodiments of the invention provide systems and methods that instantiate an analytics function locally or remotely depending on data access and data usage policies and enforce execution of the data analytics task according to such policies. Advantageously, a check is performed before any data is shared, and based on such check the data is either shared or the data analytics task requiring the data is shipped or sent to the owner of the data for remote execution by the owner of the data.

In some embodiments, the analytics tasks are executed within trusted environments. These trusted environments are commanded but not fully accessible by system administrators. In particular, analytics tasks and input data cannot be accessed directly by external users. Whereas analytics tasks and data interact with each other regulated by policies, data availabilities, and data analytics application descriptions, access control capabilities, then, regulate the access to processed data.

In some other embodiments, the analytics tasks are transmitted as a self-contained container running either source code or compiled code. According to an embodiment, the exchange of analytics tasks goes through a secure channel among trusted environments and the tasks are not accessible by any user (e.g., system administrators).

According to an embodiment, a method of controlling data usage in a distributed environment among multiple entity domains is provided. The method includes steps of: receiving, in a local entity domain, a data consuming application comprising or identifying at least a first analytics task, wherein the first analytics task processes one or more data inputs to produce first output data; determining availability of the one or more data inputs; interpreting one or more data usage policies, or data control policies, to determine one or more atomic actions to be executed, wherein at least one of the data usage policies indicates that one of the data inputs for the first analytics task must remain in a remote entity domain; and executing the one or more atomic actions, wherein the one or more atomic actions include dispatching the first analytics task to the remote entity domain for remote execution of the first analytics task and receiving the first output data of the first analytics task from the remote entity domain.

According to an embodiment, the executing the atomic actions further includes to modify the data consuming application to include one or more pre-processing functions or tasks and/or one or more post-processing functions or tasks; and instructing one or more computing nodes in the local entity domain to instantiate the one or more pre-processing functions or tasks and/or one or more post-processing functions or tasks with runtime directives.

According to an embodiment, the data analytics application includes a second analytics task, and wherein the second analytics task processes, in the local entity domain, at least the first output data of the first analytics task received from the remote entity domain to produce second output data.

According to an embodiment, each of the multiple entity domains includes a trusted environment entity configured with: a master node configured to perform the step of interpreting the one or more data usage policies to determine the one or more atomic actions to be executed, and steps of instantiating an analytics task locally or dispatching data and/or an analytics task to remote entities according to the one or more data usage policies; a data broker node configured to establish a connection with a data broker node of a remote entity domain to dispatch, to the remote entity domain, the data and/or analytics task as dynamically configured by the master node; and one or more computation nodes, each configured to instantiate one or more analytics tasks locally.

According to an embodiment, each of the multiple entity domains includes a federation broker entity configured to communicate with the other federation broker entities, to establish the connections with data broker nodes of different entity domains for the local data broker node and procure data from outside the local entity domain on behalf of the local master node and on behalf of instantiated tasks.

According to an embodiment, the method further includes retrieving or accessing the one or more data usage policies from a policies management component or node.

According to an embodiment, the policies management component or node is a centralized component separate from the local entity domain.

According to an embodiment, the policies management component or node is a distributed component and includes a portion accessible locally to the local entity domain.

According to an embodiment, the one or more data usage, or data control, policies may be specified by a user. For example, a data owner or other entity can specify the one or more data usage, or data control, policies.

According to another embodiment, a method of controlling data usage in a distributed environment among multiple entity domains is provided. The method includes the steps of: receiving, in a local entity domain, an instruction to instantiate a first analytics task, wherein the first analytics task processes one or more data inputs to produce first output data, the first analytic task having been dispatched to the local entity domain by a remote entity domain based on an interpretation of a data usage policy, or data control policy, created in the local entity domain indicating that one of the data inputs for the first analytics task must remain in the local entity domain; instantiating the first analytics task in the local entity domain; and executing the first analytics task in the local entity domain to produce the first output data; and sending the first output data to the remote entity domain.

According to an embodiment, the method further includes receiving, from a local data provider, a policy model including the data usage policy, or data control policy, wherein the received policy identifies data usage constraints for data provided by the local data provider.

According to an embodiment, the method further includes storing the one or more data usage or control policies to a policies management component or node, wherein the policies management component or node is a centralized component separate from the local entity domain; or the policies management component or node is a distributed component and includes a portion accessible locally to the local entity domain.

According to another embodiment, a data usage control system is provided that includes: a first entity domain having a first trusted environment entity; and a second entity domain having a second trusted environment entity. In an embodiment, the first trusted environment entity is configured to: receive, from a first data consumer associated in the first entity domain, a data consuming application comprising or identifying at least a first analytics task, wherein the first analytics task processes one or more data inputs to produce first output data; determine availability of the one or more data inputs; interpret one or more data usage policies or data control policies to determine one or more atomic actions to be executed, wherein at least one of the data usage or control policies indicates that one of the data inputs for the first analytics task must remain in the second entity domain; and execute the one or more atomic actions, wherein the one or more atomic actions include dispatching the first analytics task to the second entity domain for remote execution of the first analytics task and receiving the first output data of the first analytics task from the second entity domain. In an embodiment, the second trusted environment entity is configured to: receive from the first entity domain a request to instantiate the first analytics task; instantiate the first analytics task; execute the first analytics task to produce the first output data; and send the first output data to the first entity domain.

According to an embodiment, each of the first trusted environment entity and the second trusted environment entity includes: a master node configured to interpret the one or more data usage or control policies to determine the atomic actions to be executed, and instantiate an analytics task locally or dispatch data and/or an analytics task to the other entity domain according to the one or more data usage or control policies; a data broker node configured to establish a connection with a data broker node of the other entity domain to dispatch, to the other entity domain, the data and/or analytics task as dynamically configured by the master node; and one or more computation nodes, each configured to instantiate one or more analytics tasks locally.

According to an embodiment, each of the first trusted environment entity and the second trusted environment entity includes a federation broker entity configured to communicate with the other federation broker entity, to establish the connections with the data broker node of the other entity domain for the local data broker node and procure data from the other entity domain on behalf of a local master node and on behalf of instantiated analytics tasks.

According to an embodiment, the data system control system includes a policies management component or node, wherein the policies management component or node is a centralized component separate from the first entity domain and the second entity domain; or the policies management component or node is a distributed component and includes a portion accessible locally to each of the first entity domain and the second entity domain According to an embodiment, a tangible, non-transitory computer-readable medium is provided that has instructions thereon which, upon being executed by one or more processors, alone or in combination, provide for execution of any of the methods described herein, such as, for example, methods of controlling data usage in a distributed environment.

Figure 2:
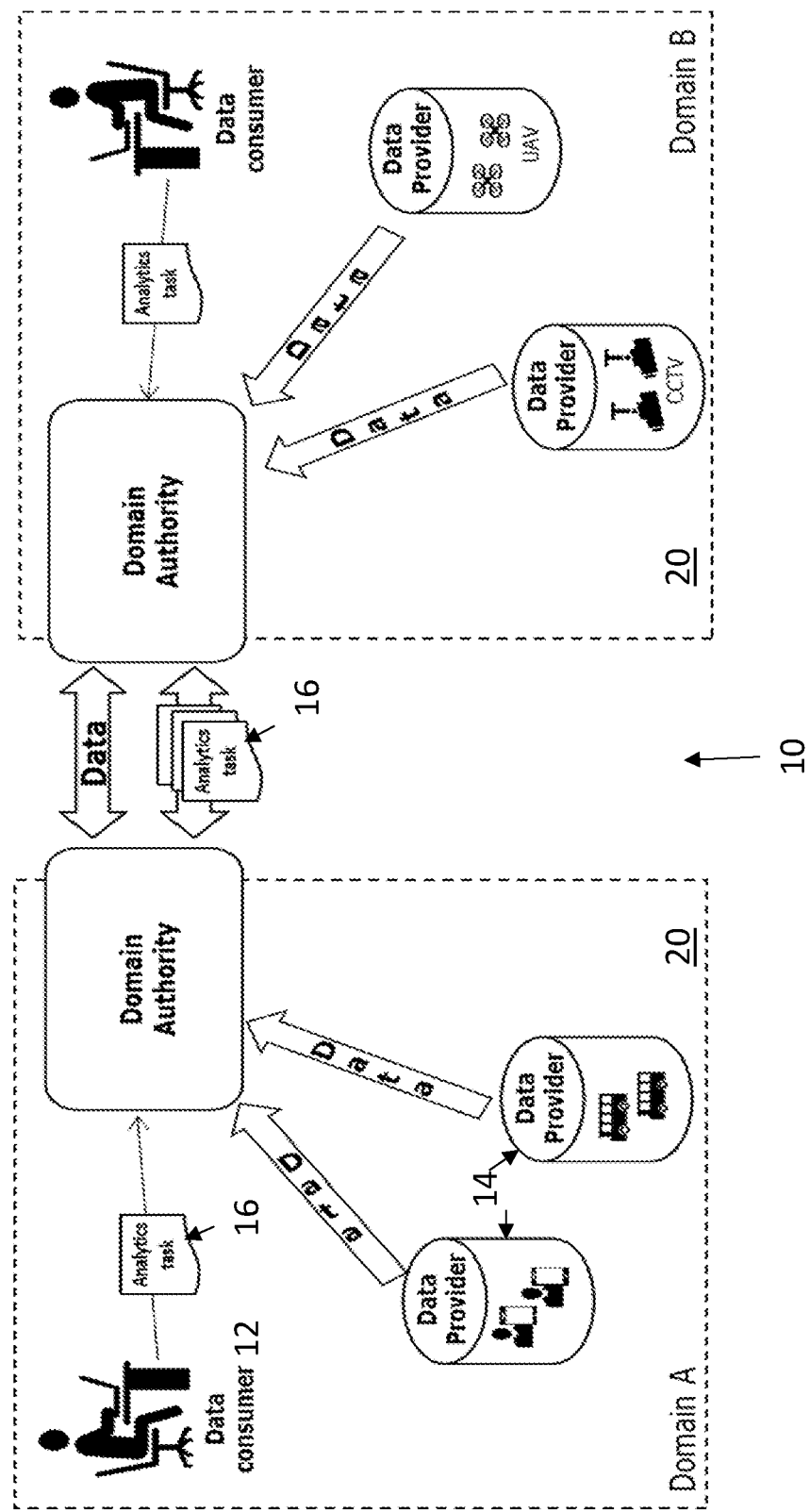
FIG. 2 illustrates a decentralized system for data usage control, where data consumers and data providers are clustered in domains, according to an embodiment.

FIG. 2 illustrates a decentralized system 10 for data usage control, where data consumers 12 and data providers 14 are clustered in domains 20, according to an embodiment. This may be useful, for example, for multiple companies where each of the companies may be represented as a separate domain. This may also be useful for smart cities, for example, where a city administration (or a district administration in case of big metropolitan areas) is a domain that interacts with other city (or district) administration domains. Each domain includes one or multiple computer processing nodes as will be described herein as well as appropriate technologies enabled to prevent unauthorized access and/or unauthorized transmission of data into or out of the domain.

Figure 3:
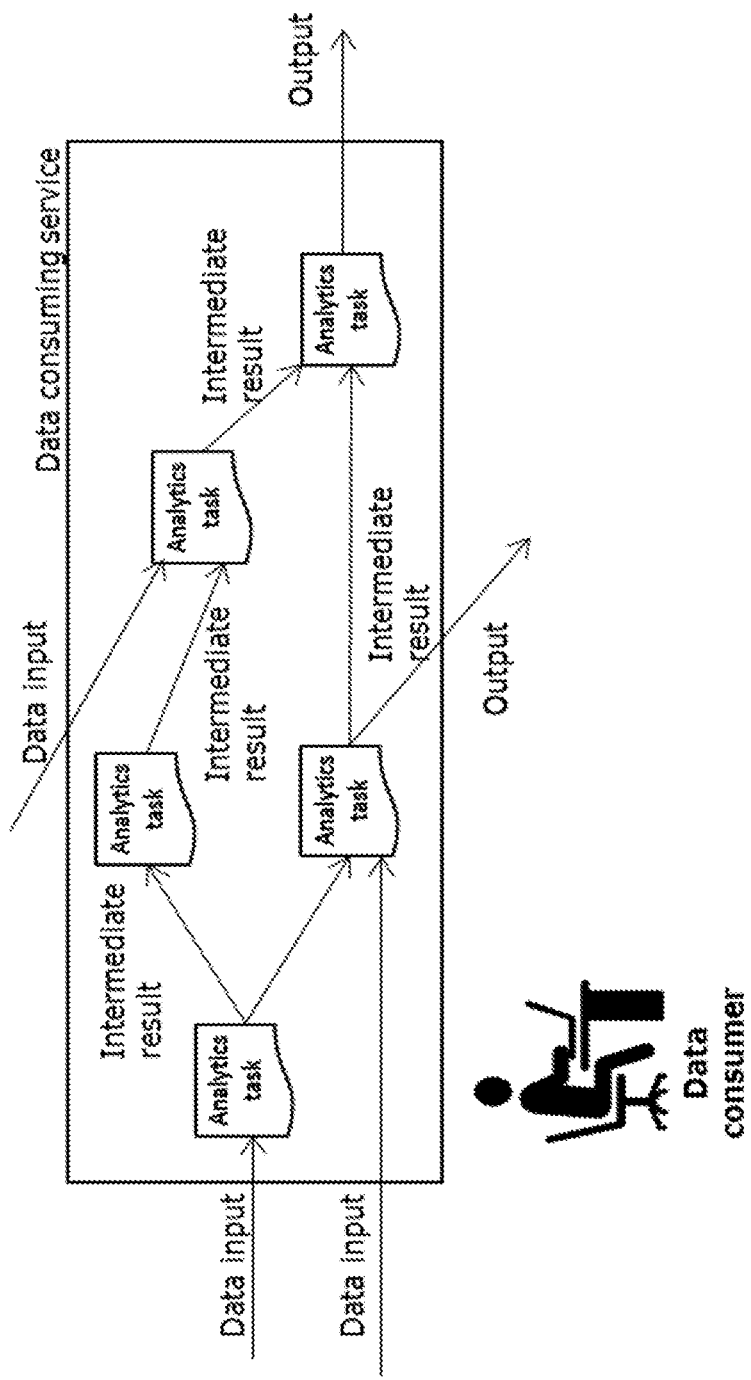
FIG. 3 illustrates an example of a data consumer service as designed by a data consumer, according to an embodiment.

FIG. 3 illustrates an example of a data consumer service as designed by a data consumer 12, according to an embodiment. In an embodiment, a data consuming service is a topology of one or multiple analytics tasks 16. The input data of an analytics task 16 can be either a finite dataset or a data stream. Some analytics tasks 16 may use the data output of other analytic tasks 16, possibly together with other external data input. The final output may be utilized for other purposes such as taking decisions or taking actions.

In an embodiment, an analytic task 16 is specified as having one or more data inputs, a data analytics identifier and a data output. The data output is the processed data of the analytic task. In an embodiment, the data analytics identifier (ID) univocally or uniquely identifies the specific data analytics component which can be audited, either by an authority or by a data provider. In an embodiment, each of the one or more data inputs may be defined by an entity type, a scope (such as a geographical scope), and one or more entity properties. A data stream may be mapped as a query. An example of a data stream mapped as an NGSI query follows:

```
{
    "entities": [{
        "id": ".*",
        "isPattern": true,
        "type": "vehicle"
    },
    "attributes": ["speed"],
    "restriction":{
        "scopes":[
            {
                "scopeType":"nearby",
                "scopeValue":{
                    "latitude":35.692221,
                    "longitude":139.709059,
                    "limit":1
                }
            }
        ]
    }
}
```

Figure 4:
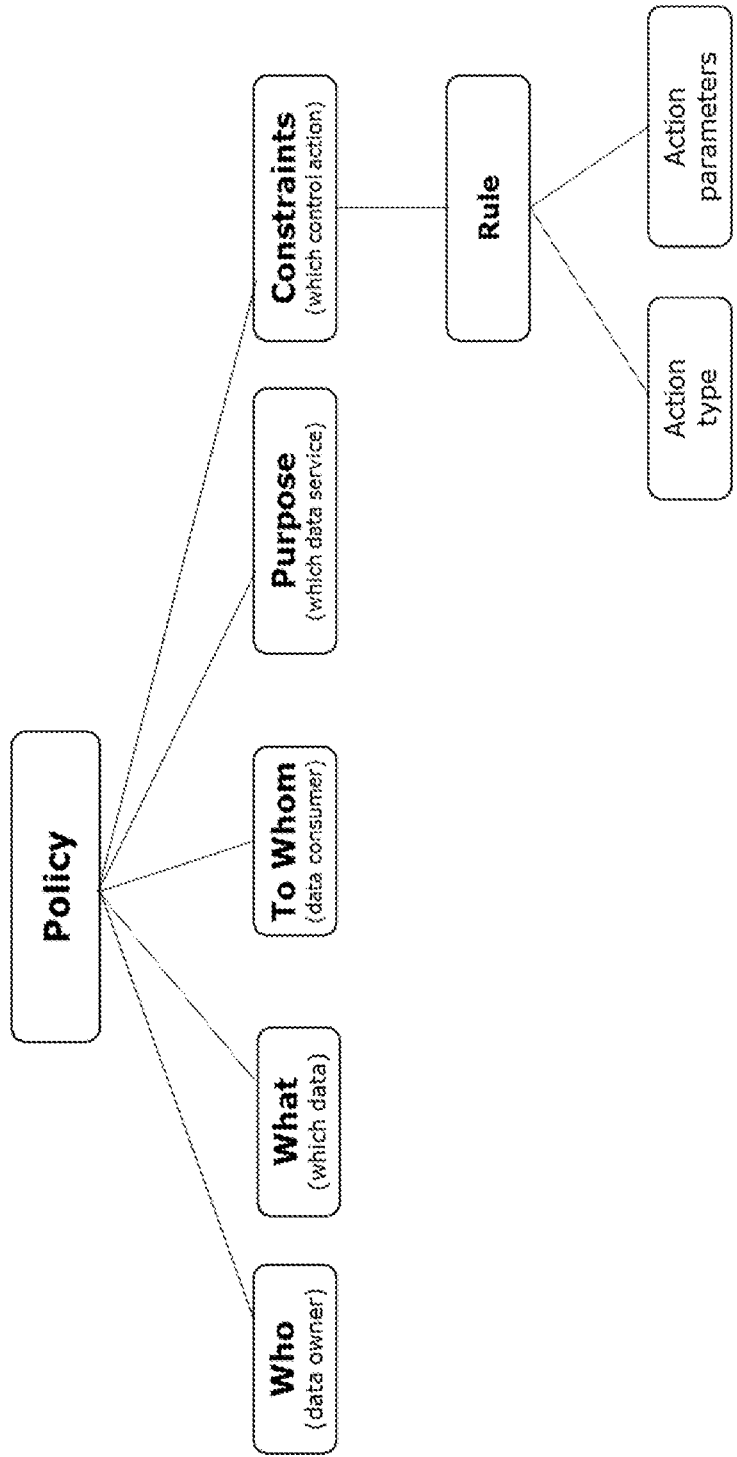
FIG. 4 illustrates a data usage control policy model according to an embodiment.

In an embodiment, a data owner or other entity can specify a data control policy following the policy model shown in FIG. 4. In an embodiment, a data control policy is specified by multiple fields, including one or more of:

Who: the owner of the data;
What: the data targeted by the policy, e.g., type of data;
To whom: the data consumer that targets the policy—can be either one or more specific domain name(s) or any;
Purpose: the specific application targeted by the policy—can be either one or more specific data consuming service name(s) or any;
Constraints: the limitations on the usage of the targeted data—a constraint is formed by one or more rules: a rule is a combination of an action type to be enforced and is configured by action parameters.

Figure 5:
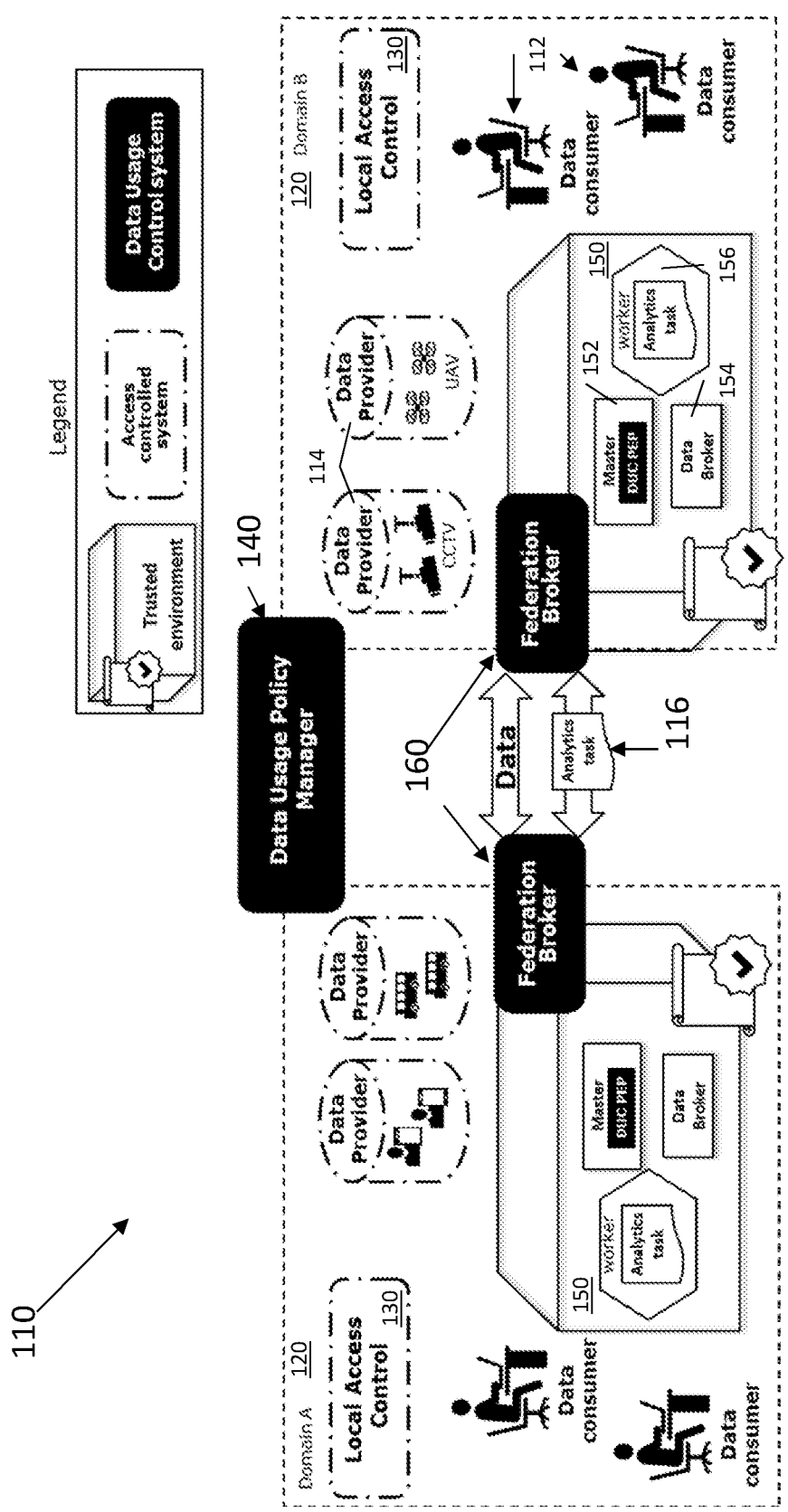
FIG. 5 illustrates a decentralized data usage control system according to an embodiment.

FIG. 5 illustrates a decentralized data usage control system according to an embodiment. In an embodiment, the system 110 is clustered into domains 120. Each domain 120 includes, or is formed by, a local (intra-domain) access control policy decision point (PDP) entity 130 that regulates authorization and authentication control, one or multiple data providers 114 that enforce access control to the incoming requests. Data providers 114 are not accessible from the outside the domain. Each domain 120 also includes one or multiple data consumers 112 that have no direct connection to outbound the domain. Data consumers design services as a topology of analytics tasks. A particular case is a single task topology. Each domain 120 also includes a federated data usage policies manager 140 that stores the data usage control policies for all the data items; this component can be centralized or distributed. In the distributed case, as shown in FIG. 5, local data policies managers 130 are synchronized in the federation through mechanisms such as distributed databases or blockchain. The access control policies are a special case of data usage policies. Thus, federated data usage policies manager 140 component handles such policies. Each domain 120 also includes a trusted environment 150 that enforces data usage control policies which can be commanded only by the administration for the local domain. The trusted environment 150, in an embodiment, is composed of: a master component 152 that handles services descriptions coming from the data consumers 112, checks the data usage control policies (through the Data Usage Control Policy Enforcement Point—DUC PEP), and instantiates locally or dispatches in the federation the analytics tasks 116 accordingly to the data usage control policies; a data broker component 154 that dispatches the data as dynamically configured by the master; and one or more workers 156 that are computing node(s) where a task analytics can be instantiated. Each domain 12o also includes a federation broker 160 that is the only component that can communicate outside the domain (with other federation brokers 160 for other domains). The access to the federation broker 160 is regulated within each domain and it is assumed to be trusted. In the simplest configuration, only the local domain's trusted environment's master 152 and other domains' federation brokers 160 can make requests to the local federation broker 160. The federation broker 160 procures data for the analytics tasks 116. If the data is available from an external domain, the federation broker 160 sends a request for data to the respective federation broker 160 of the other domain 120. If the data is available from within the domain, the federation broker 160 sends a request for data to local data provider(s) 114. In case the data is available internally and externally, the federation broker 160 procures both internal and external data, if not differently instructed (e.g., by an input scope).

Figure 6:
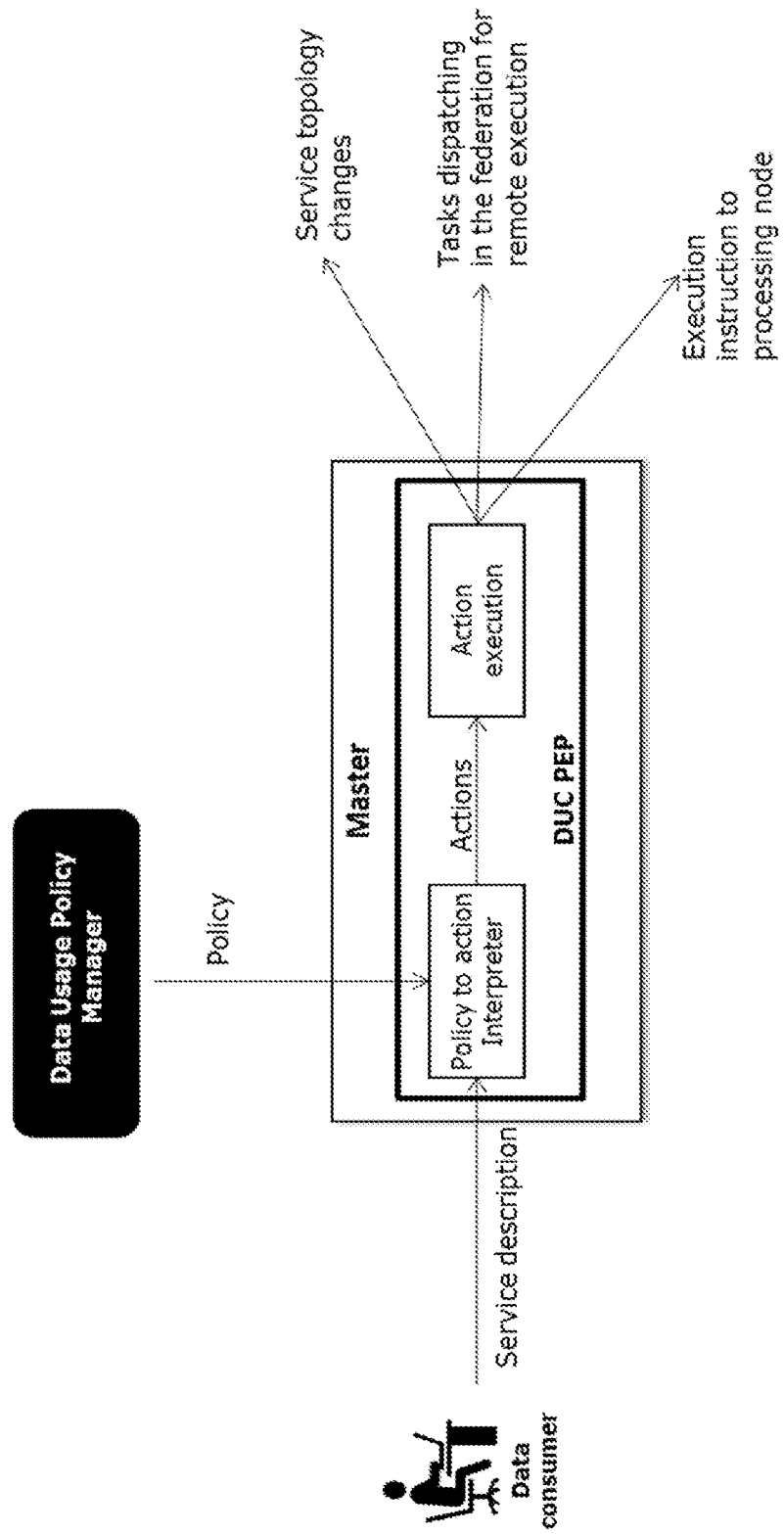
FIG. 6 illustrates data usage policy interpretation by a master according to an embodiment.

FIG. 6 illustrates data usage policy interpretation by a master 152 according to an embodiment. The master 152 is in charge of enforcing the data usage policies. The master 152 is capable of interpreting policies, translating the policies into atomic actions and orchestrating the execution of the action(s) in the system. In an embodiment, execution of actions may include: changing of the service processing topology to accommodate pre- or post-processing functions; dispatching task descriptions in the federation in order to have the task(s) executed remotely (e.g., within the data owner premises in another domain); and instructing the computing nodes within the local domain with task instantiation and directive of the instantiation.

Figure 7:
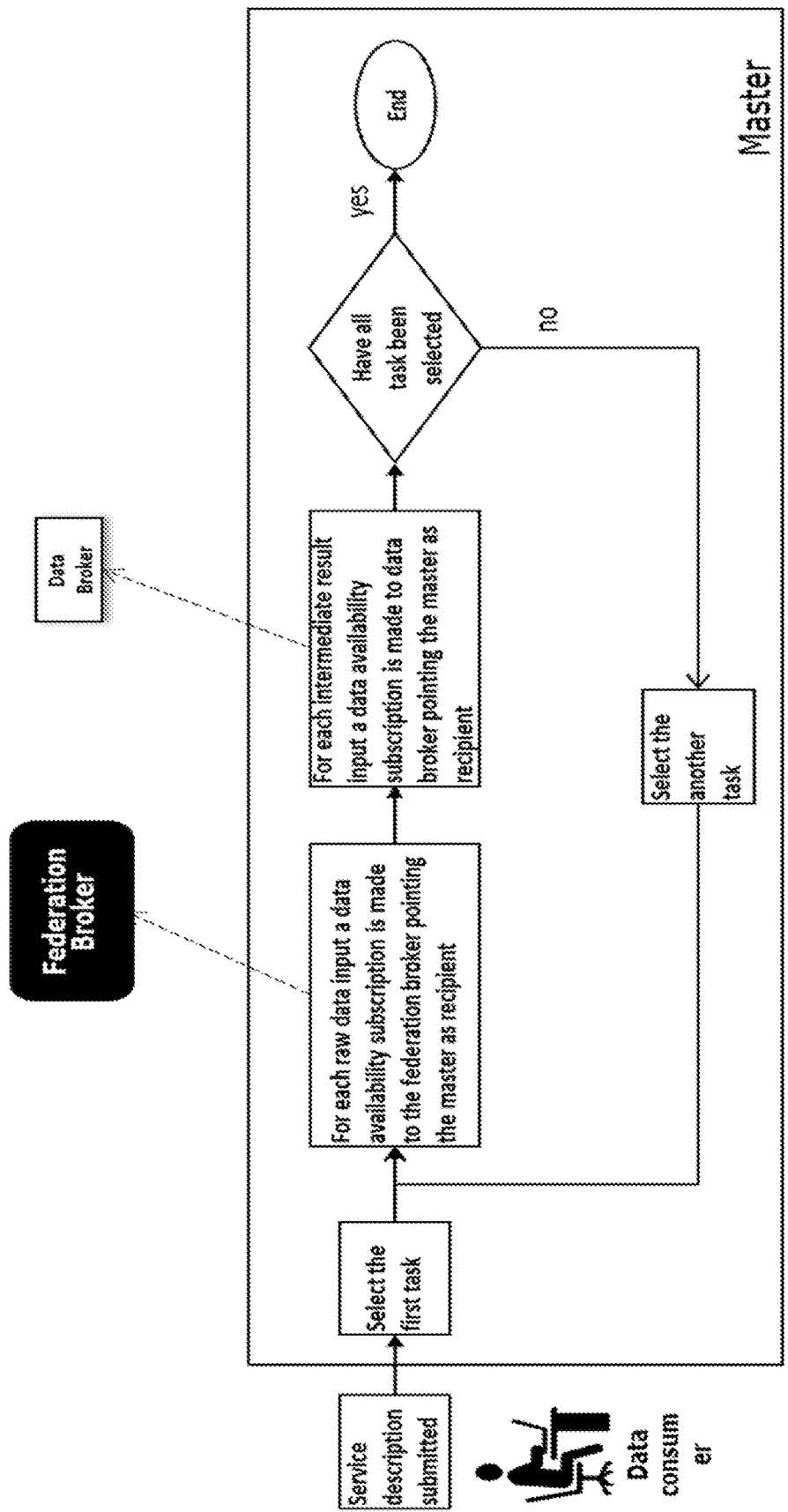
FIG. 7 illustrates behavior of a master upon receiving a service description, according to an embodiment.

FIG. 7 illustrates behavior of a master 152 upon receiving a service description, according to an embodiment. In an embodiment, when a data consumer 112 submits the developed service to the trusted environment, for each external data input of an analytics task part of the service, the master component 152 establishes: 1) a data subscription in the federation broker 160 identifying as a data stream recipient the data broker component 154; 2) a data subscription in the data broker component 154 identifying the analytics task as a recipient (after the task analytics is actually instantiated). For each of intermediate result input of an analytics task part of the service the master component 152 establishes a data subscription in the data broker 154 identifying the analytics task as a recipient (after the task analytics is actually instantiated).

In an embodiment, when a pre-processing task is instantiated, the master 152 will proceed to: 1) if the data availability notification is received from the federation broker 160, establish a data subscription to the federation broker 160 for the notified data available pointing to the data broker 154 as recipient; 2) establish a data subscription to the data broker 154 for the notified data available pointing to the data analytics as recipient. In some embodiments, the master 152 sends directives also for the pre-processing task.

Example Embodiment 1: Anonymization by Replacement

As an example, assume a tourist operator data provider generates Internet of things (IoT) data from an application installed into smartphones of citizens. The data generated may be similar to the following:

```
{"contextElements": [{
"entityId": {"id":"john.doe", "isPattern": false, "type":"user"},
"attributes": [{"name":"SimpleGeolocation", "type":"point", "value":
{"latitude":43.4628, "longitude":-3.80031}}]}]}
```

Assume now that the tourist operator desires to sell the collected data but without disclosing the username of a user. A user, hence, may set a policy such as the following:

Who: tourist operator

What: entityType:user

To whom: public transportation company

Purpose: fleet schedule optimizer

Constraints: {Action: username anonymization function}

Such policy can be translated in Open Digital Rights Language (ODRL) as the following:

```
... .
    "uid": "http://example.com/policy:88",
    "permission": [{
        ... .,
        "target": "entityType:user",
        "action": "use",
        "duty": [{
            "action": [{
                "rdf:value": { "@id": "preprocess" },
                "refinement": [{
                    "leftOperand": "useFunction",
                    "operator": "eq",
                    "rightOperand":
                    "usernameAnonymizationFunction"
                }]
            }]
        }]
... .
```

Figure 9:
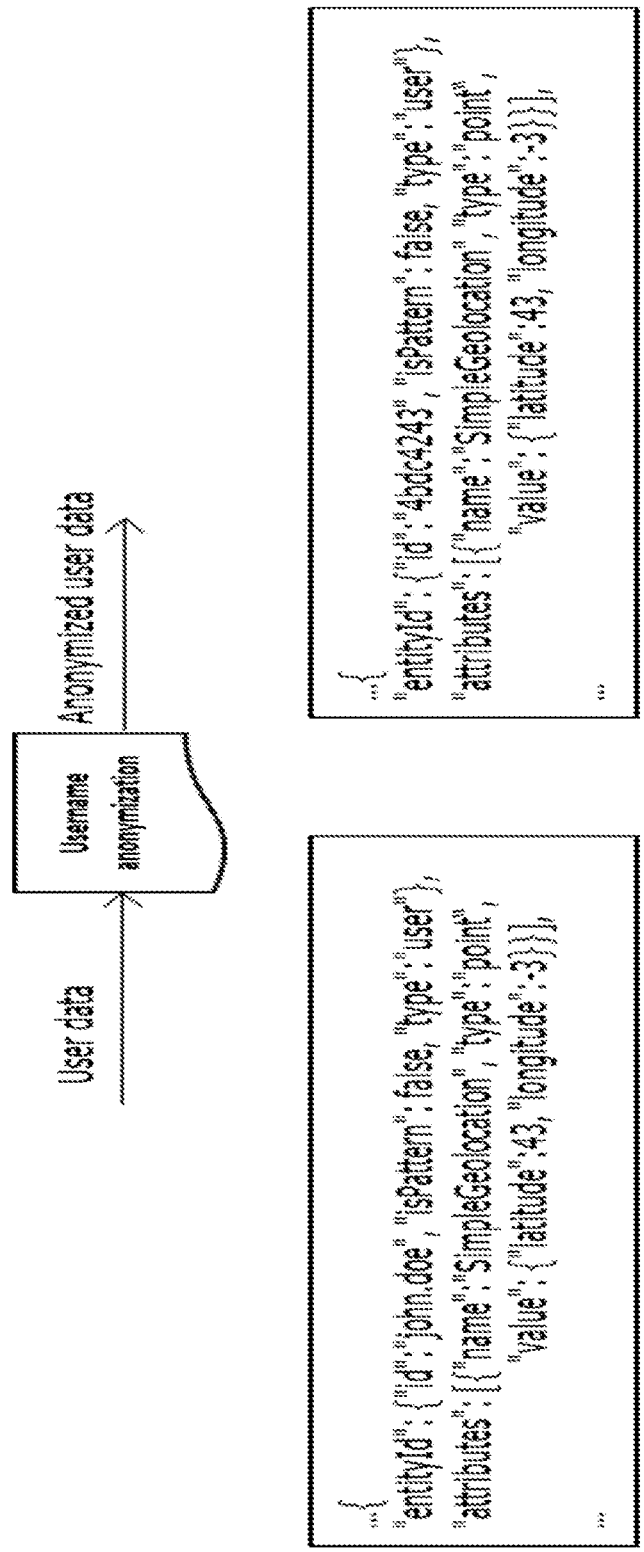
FIG. 9 shows an example of the input and the output of the anonymization function, according to an embodiment.

Here, the usernameAnonymizationFunction (anonymization function) is the ID of a function that takes as input the data, and returns the same data but with the username hashed or removed. In some other embodiments, the hash is salted with a seed changing periodically (e.g. every 2 hours). An example of the input and the output of the anonymization function is shown in FIG. 9.

Figure 10:
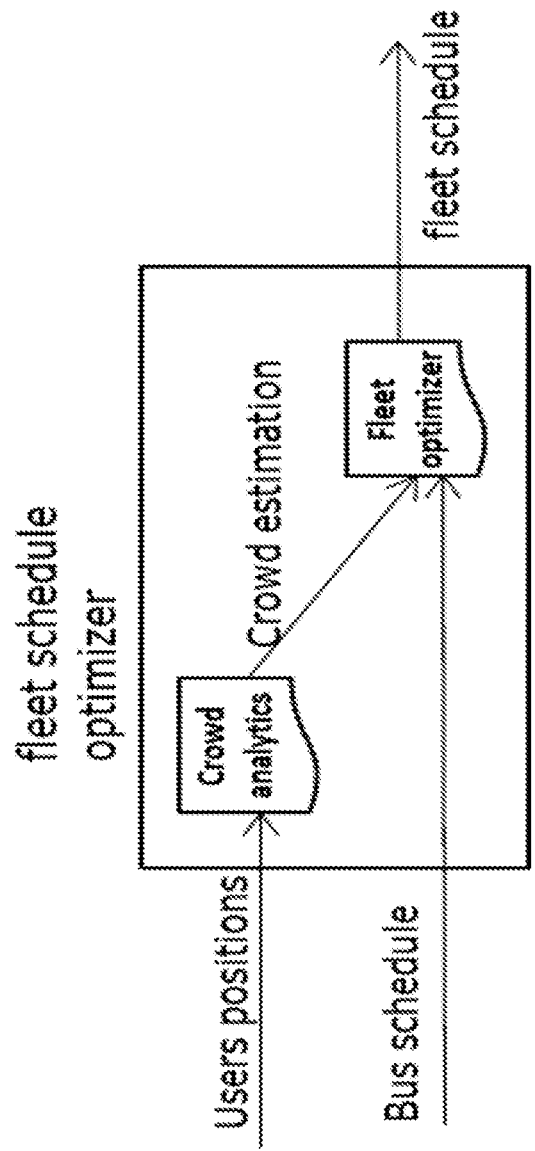
FIG. 10 shows an example of a fleet schedule optimizer (data consuming service) according to an embodiment.

As a data consumer, a public transportation company may wish to use such data from the tourist operator provider, for example, for computing the size of a crowd and its mobility within a city. Such information is useful to optimize the scheduling of the bus fleet usage: use big buses for the most crowded area and small bus otherwise. This is for the final scope of providing a better service to citizens while minimizing fuel consumption. FIG. 10 shows an example of a fleet schedule optimizer (data consuming service). The crowd analytics task generates data of entity type "crowdEstimation" and may be configured such that it requests data with the following query:

```
{
    "entities": [{
        "id": ".*",
        "isPattern": true,
        "type": "user"
    },
    "attributes": ["SimpleGeolocation "],
    "restriction":{
        "scopes":[
            {
                "scopeType": "nearby",
                "scopeValue":{
                    "latitude":42.692221,
                    "longitude":-3.709059,
                    "limit":1
                }
            }
        ]
    }
}
```

The fleet optimizer task generates data of entity type "fleet schedule" and has two queries for inputs:

```
1:      {    "entities": [{
                 "id": ".*",
                 "isPattern": true,
                 "type": "crowdEstimation"
             }... .
and
2:      {    "entities": [{
                 "id": ".*",
                 "isPattern": true,
                 "type": "busSchedule"
             }... .
```

Figure 11:
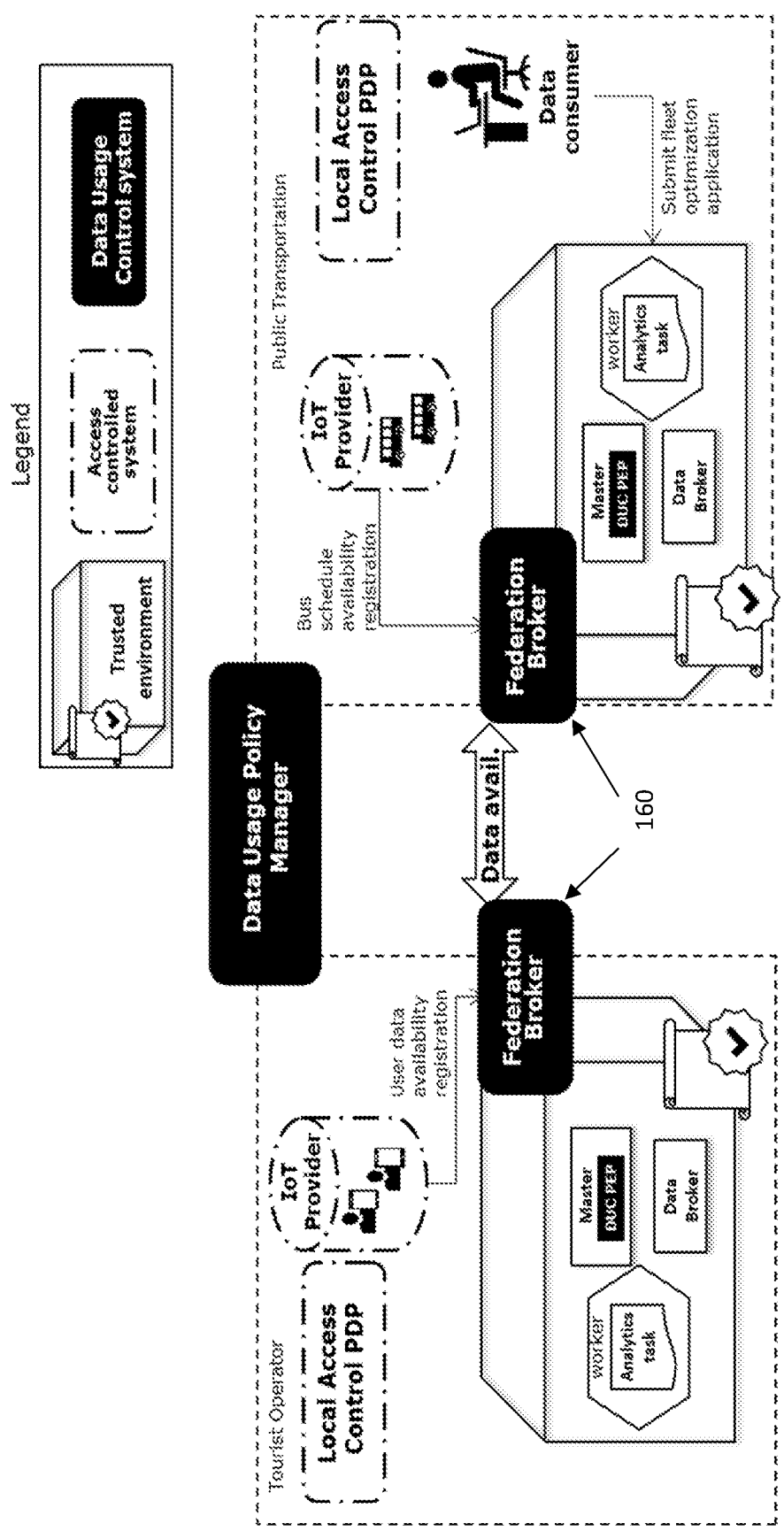
FIG. 11 the situation of the available data and the submitted analytics application in the control system, according to an embodiment.

The public transportation company submits the analytics application to the system; the situation of the available data and the submitted analytics application is depicted in FIG. 11. As shown, both federation brokers 160 are aware of the available "user" data and "bus schedule" data since this information is propagated among all the federation brokers together with the reference about who is the data provider. The data usage policies are available to the data usage control Policy Enforcement Point (DUC PEP) through the data usage policy manager 140. In some embodiments, the data usage policy manager 140 is de-centralized among the domains such as the federation broker.

In addition, access control policies may be stored in the Local Access Control Policy Decision Point (PDP). Those policies specify that the local domain federation broker can access the data available in their domain.

Figure 8:
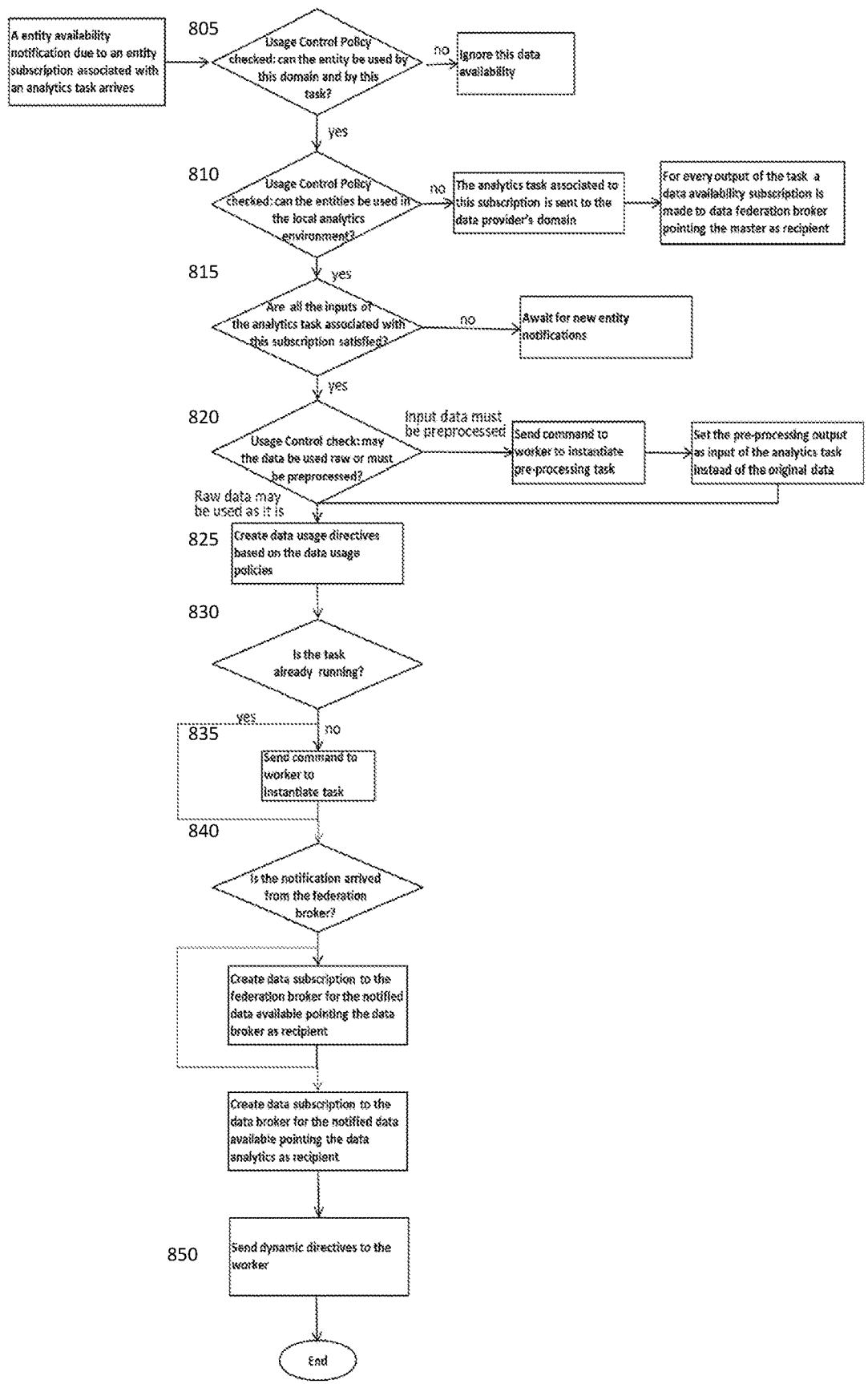
FIG. 8 illustrates a data consumer service data usage control process according to an embodiment.

When the "fleet schedule optimize" application is submitted to the trusted environment, the input data needed are:
EntityType user; input needed by crowd analytics task
EntityType: crowdEstimation; input needed by fleet optimizer task
EntityType: busSchedule; input needed by fleet optimizer task The Federation Broker of the Public Transportation domain (FedB_PT) checks and determines that the only input needed for the crowd analytics task is available and it checks the data usage policies as shown in FIG. 8, which illustrates an embodiment of a data consumer service data usage control process.

After an analytics task for a subscription entity is received, at step 805, a determination is made as to whether the entity be used by this domain and by this task. In this example, there is no restriction on this, so the process moves to step 810. Otherwise the data availability would be ignored. At step 810, a determination is made as to whether the entities may be used in the local analytics environment. In this example, there no restriction on this, so the process proceeds to step 815. Otherwise, the analytics task associated with the subscription is sent to the domain of the data provider; for every output of the task, a data availability subscription is made to the data federation broker identifying the master as the recipient.

At step 815, a determination is made as to whether all the inputs of the analytics task associated with this subscription are satisfied. In this example, the inputs are satisfied and the process moves to step 820. Otherwise the system would wait for new entity notifications. At step 820, a determination is made as to whether the data may be used raw or must be pre-processed. In this example, the data must be pre-processed, so a command is sent to a worker to instantiate a pre-processing task (in this example to instantiate the processing usernameAnonymizationFunction task into the worker, and the worker makes a subscription to the data broker for data of type "user" on behalf of the usernameAnonymizationFunction). The pre=processing output is set as the input of the analytics task instead of the original (unprocessed) data.

Figure 12:
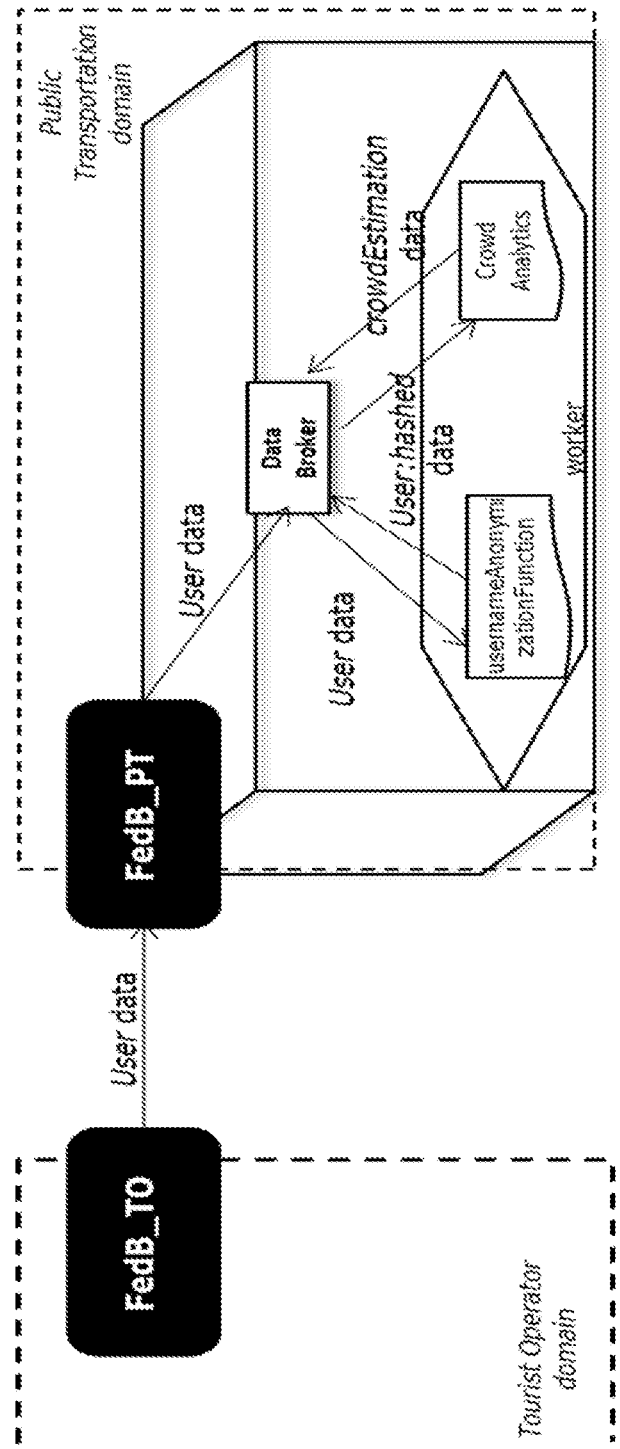
FIG. 12 shows an aspect of the data control process in the context of the crowd analytics task, according to an embodiment.

At step 825, one or more data usage directives are created based on the data usage policies. In this example, no more data usage policies are needed. At step 830, a determination is made as to whether the crowd analytics task is already running. If the task is not already running, at step 835, a command is sent to the worker to instantiate the task in the worker. In this example, the worker makes a subscription to the data broker for data of type "user:hashed" on behalf of the crowd analytics task. If the task is already running, then at step 840, a determination is made as to whether the notification of available data has arrived from the federation broker (FedB_PT). If the notification has arrived, a subscription for entityType "user" is made to the Federation Broker of the Tourist Operator (FedB_TO) pointing as callback the FedB_PT. A subscription for entityType "user" (inferred from the function description) is created and identifies to the data broker. Once the user data arrives to the data broker, the latter will notify the to the anonymization function (see step 820). A subscription for entityType "user:hashed" (inferred from the function description) is created and identifies the data broker. Once the user:hashed data arrives to the data broker, the latter will notify the data to the crowd analytics task (see step 830). FIG. 12 shows an aspect of the data control process in the context of the crowd analytics task, according to an embodiment.

Figure 13:
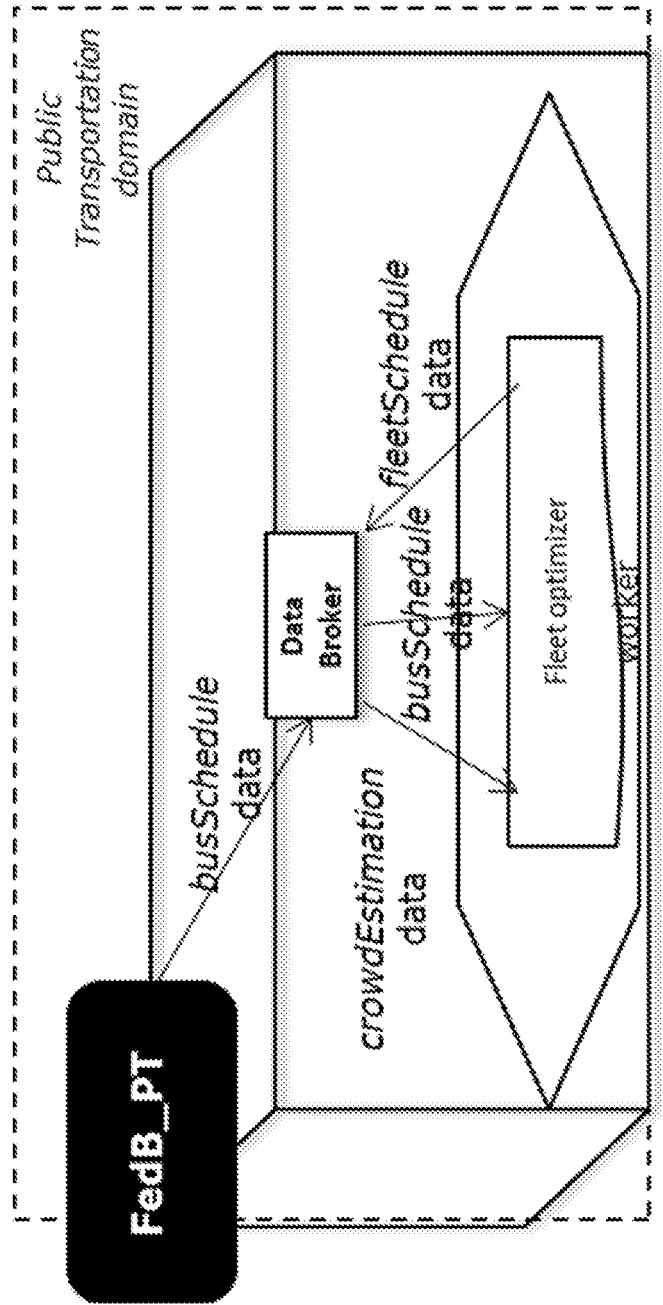
FIG. 13 shows an aspect of the data control process in the context of the fleet optimizer task, according to an embodiment.

FIG. 13 shows an aspect of the data control process in the context of the fleet optimizer task, according to an embodiment. The handling of the fleet optimizer task is similar to the previous workflow above. Since both the crowdEstimation data and the busSchedule data are available locally without restriction, the task is instantiated together with the input data flow. The output data is then available to be retrieved by, or delivered to, the data consumer.

Example Embodiment 2: Fenced Data

In some embodiments the user data cannot leave the domain where it is produced. In the previous scenario, for example, this means that the user data cannot leave the tourist operator domain if not anonymized. That also means the data cannot leave a virtual fence which is represented by the tourist operator premises. In an embodiment, the user, hence, sets a policy such as the following:

Who: tourist operator

What: entityType:user

To whom: public transportation company

Purpose: fleet schedule optimizer

Constraints: {Action: fenced data}, {Action: username anonymization function}

Such policy can be translated in Open Digital Rights Language (ODRL) as the following:

```
... .
"uid": "http://example.com/policy:88",
"permission": [{
    ... .,
    "permission": [{
        "target": "entityType:user",
        "action": "use",
        "duty": [{
            "action": [{
                "rdf:value": { "@id": "preprocess" },
                "refinement": [{
                    "leftOperand": "useFunction",
                    "operator": "eq",
                    "rightOperand": "usernameAnonymizationFunction"
                }]
            }]
        }]
    }],
    "prohibition": [{
        "target": "entityType:user",
        "action": "access"
        "refinement": [{
            "leftOperand": "username",
            "operator": "neq",
            "rightOperand": "touristOperator",
        }]
    }]
}]
... .
```

In this case the steps 805 and 810 proceed differently than above, for example:

805: Can the entity be used by this domain and by this task? There is no restriction on this, thus yes.

810: Can the entities be used in the local analytics environment? No because it can be used only within the premises of the touristOperator. Thus, the crowd analytics task description is sent to the other domains using a message, and a subscription is made to the FedB_PT for data of type "crowdEstimation" on behalf of the master.

Figure 14:
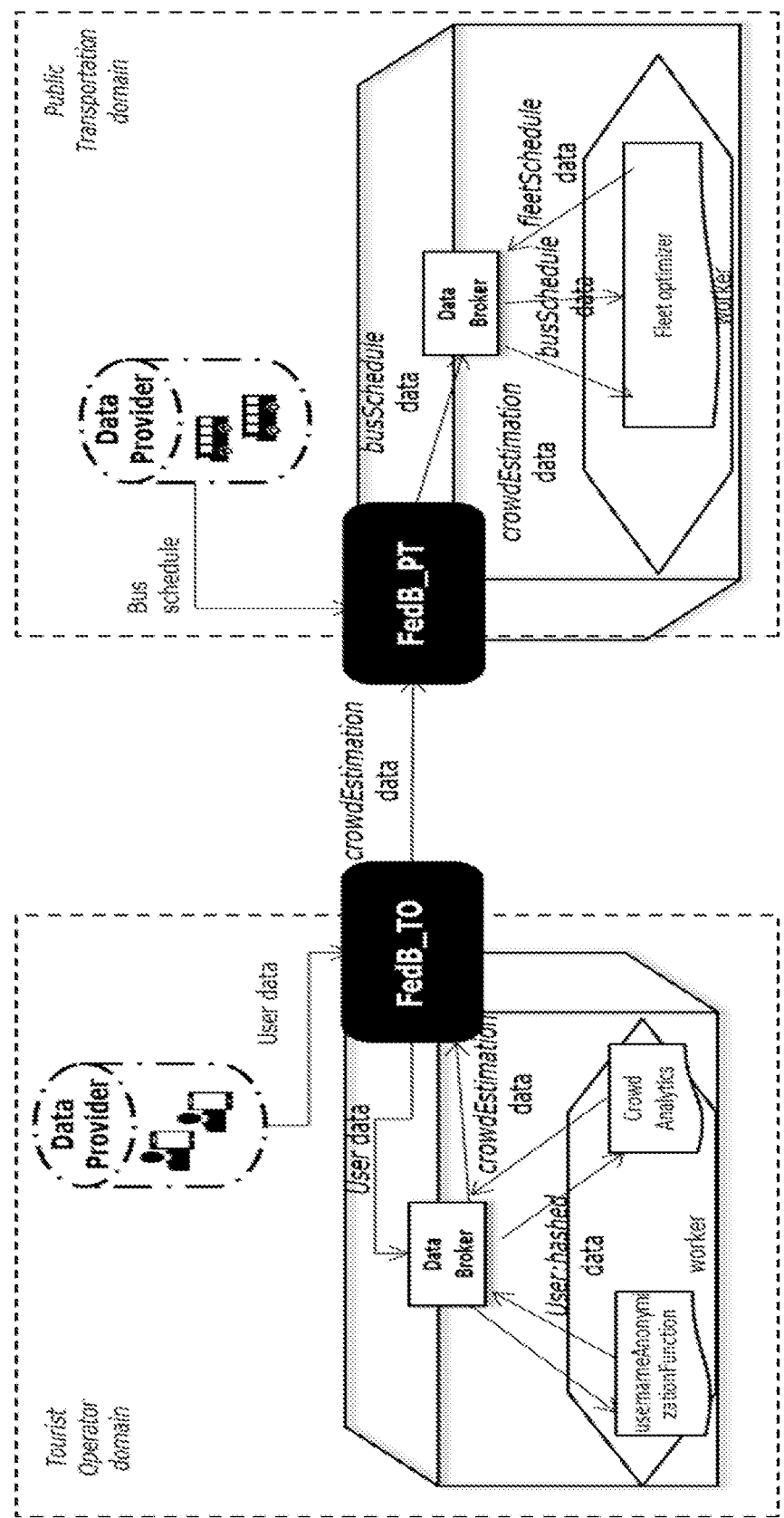
FIG. 14 shows data processing for a specific task, according to an embodiment.

At this point the execution environment on the tourist operator domain will handle the crowd estimation task and being that all the constraints are satisfied it will instantiate the task locally together with the anonymization function. Then, the crowd estimation data generated by the task is made available through the FedB_TO as shown in FIG. 14.

Example Embodiment 3: Data Usage with a Time Window Refinement (Usage of Directives)

In this embodiment, the user data can be used only if the dataset time-window span maximum for a determined period (e.g., 2 hours).

The user, hence, sets a policy such as the following:

Who: tourist operator

What: entityType:user

To whom: public transportation company

Purpose: fleet schedule optimizer

Constraints: {Action: username anonymization function}, {Action: time window; Parameters: 120 minutes}

Such policy can be translated in Open Digital Rights Language (ODRL) as the following:

```
... .,
"permission": [{
    "target": "entityType:user",
    "action": "use",
    "refinement": [{
        "leftOperand": "timewindow",
        "operator": "lt",
        "rightOperand": { "@value": "120", "@type": "xsd:integer" },
        "unit": "http://qudt.org/vocab/unit/MinuteTime"
    }],
    "duty": [{
        "action": [{
            "rdf:value": {"@id": "preprocess" },
            "refinement": [{
                "leftOperand": "useFunction",
                "operator": "eq",
                "rightOperand": "usernameAnonymizationFunction"
            }]
        }]
    }]
}]
...
```

For this example, the steps performed in FIG. 8 are similar to example embodiment 1 but there is another constraint to enact. This is handled by runtime directives. The steps become, for example:

805: Can the entity be used by this domain and by this task? There is no restriction on this, thus yes.

810: Can the entities be used in the local analytics environment? There is no restriction on this, thus yes.

815: Are all the inputs of the analytics task associated with this subscription satisfied? Yes.

820: May the data be used raw or must be preprocessed? No, then instantiate the processing usernameAnonymizationFunction task into the worker. The worker makes a subscription to the data broker for data of type "user" on behalf of the usernameAnonymizationFunction.

825: Create data usage directives based on the data usage policies—max data window is 2 hours, therefore create a directive that instructs the worker to re-instantiate (e.g., stop, remove and start) the crowd analytics task. An example of directive is as follow:

{"target":"crowdAnalyticsTask","action":"re-instantiate", "frequency": {"value": "120", "type": "xsd:integer", "unit": "http://qudt.org/vocab/unit/MinuteTime"}}

830: Is the crowd analytics task already running? No, then instantiate it in the worker; The worker makes a subscription to the data broker for data of type "user:hashed" on behalf of the crowd analytics task.

840: Is the notification of available data arriving from the federation broker (FedB_PT)? Yes, then make a subscription for entityType "user" to the Federation Broker of the Tourist Operator (FedB_TO) pointing as callback the FedB_PT. A subscription for entityType "user" (inferred from the function description) is created and identifies the data broker. Once the user data arrives to the data broker, the latter will notify it to the anonymization function (see step 820). A subscription for entityType "user:hashed" (inferred from the function description) is created and identifies the data broker. Once the user:hashed data arrives to the data broker, the latter will notify it to the crowd analytics task (see step 830).

850: The generated directive is sent to the worker.

Example Embodiment 4: Fenced Data for Bandwidth Saving

Figure 15:
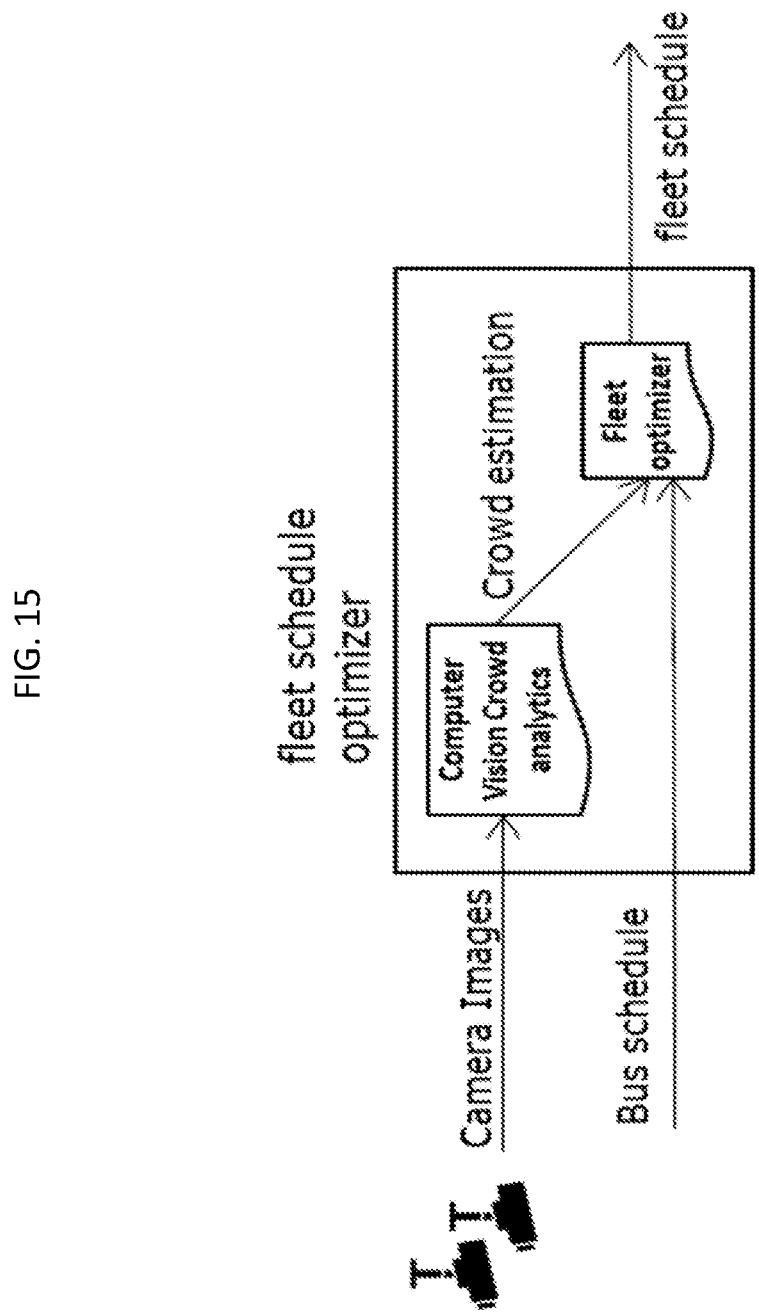
FIG. 15 shows a use case example, with crowd estimation inferred from computer vision applied on security cameras, according to an embodiment.

In another use case, crowd estimation might be inferred from computer vision applied on security cameras as shown in FIG. 15. Security cameras are handled by homeland security, as an example, which holds and uses data only within their premises. This is due to privacy regulations, but, also, may be for bandwidth reasons, since forwarding such data towards external data consumers might overload connections. With the present embodiments, the homeland security may set up a rule for fenced data.

For example, in some embodiments the user data cannot even leave the domain where it is produced. In the previous scenario, this means that the user data cannot leave the tourist operator domain if not anonymized. That also means the data cannot leave a virtual fence which is represented by the tourist operator premises.

The user, hence, may set a policy such as the following:
Who: homeland security
What: entityType:user
To whom: public transportation company
Purpose: fleet schedule optimizer
Constraints: {Action: fenced data}

Such policy can be translated in Open Digital Rights Language (ODRL) as the following:

```
... .
    "uid": "http://example.com/policy:54",
    "permission": [{
        ... .,
        "permission": [{
            "target": "entityType:cctv",
            "action": "use" ,
        "prohibition": [{
            "target": "entityType:cctv",
            "action": "access"
            "refinement": [{
                "leftOperand": "username",
                "operator": "neq",
                "rightOperand": "touristOperator",
            }]
    }]
... .
```

In this case the steps 805 and 810 proceed differently than above, for example:

805: Can the entity be used by this domain and by this task? There is no restriction on this, thus yes.

810: Can the entities be used in the local analytics environment? No because it can be used only within the premises of the homeland security. Thus, the crowd analytics task description is sent to the other domains using a message and a subscription is made to the FedB_PT for data of type "crowdEstimation" on behalf of the master.

Figure 16:
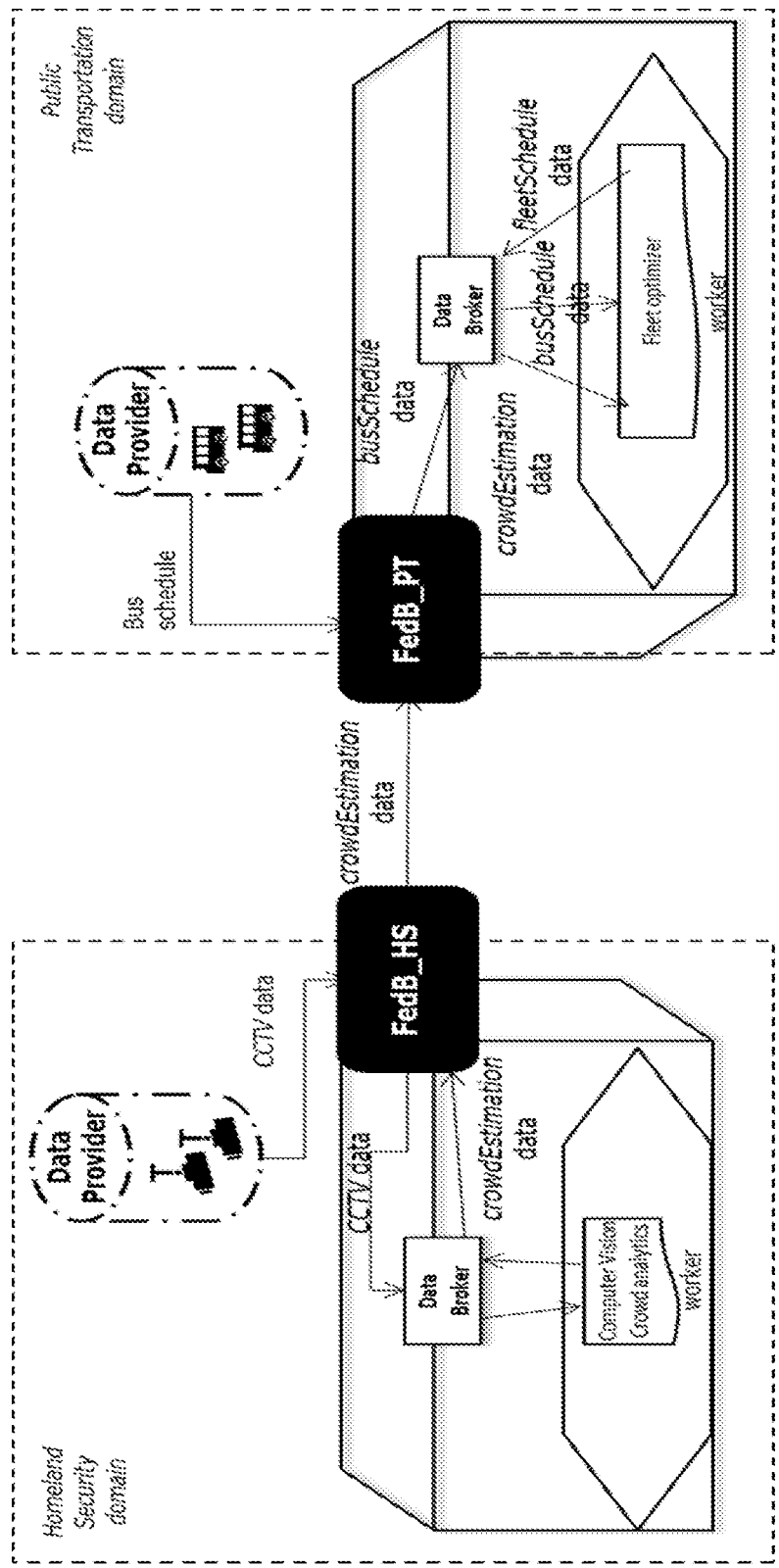
FIG. 16 shows data processing for a specific task, according to an embodiment.

At this point the execution environment on the homeland security domain will handle the computer vision crowd estimation task and being that all the constraints satisfied it will instantiate the task locally. The crowd estimation data generated by the task is then made available through the FedB_HS as shown in FIG. 16.

Example Embodiment 5: Healthcare Fenced Data and Anonymization by Aggregation

Figure 17:
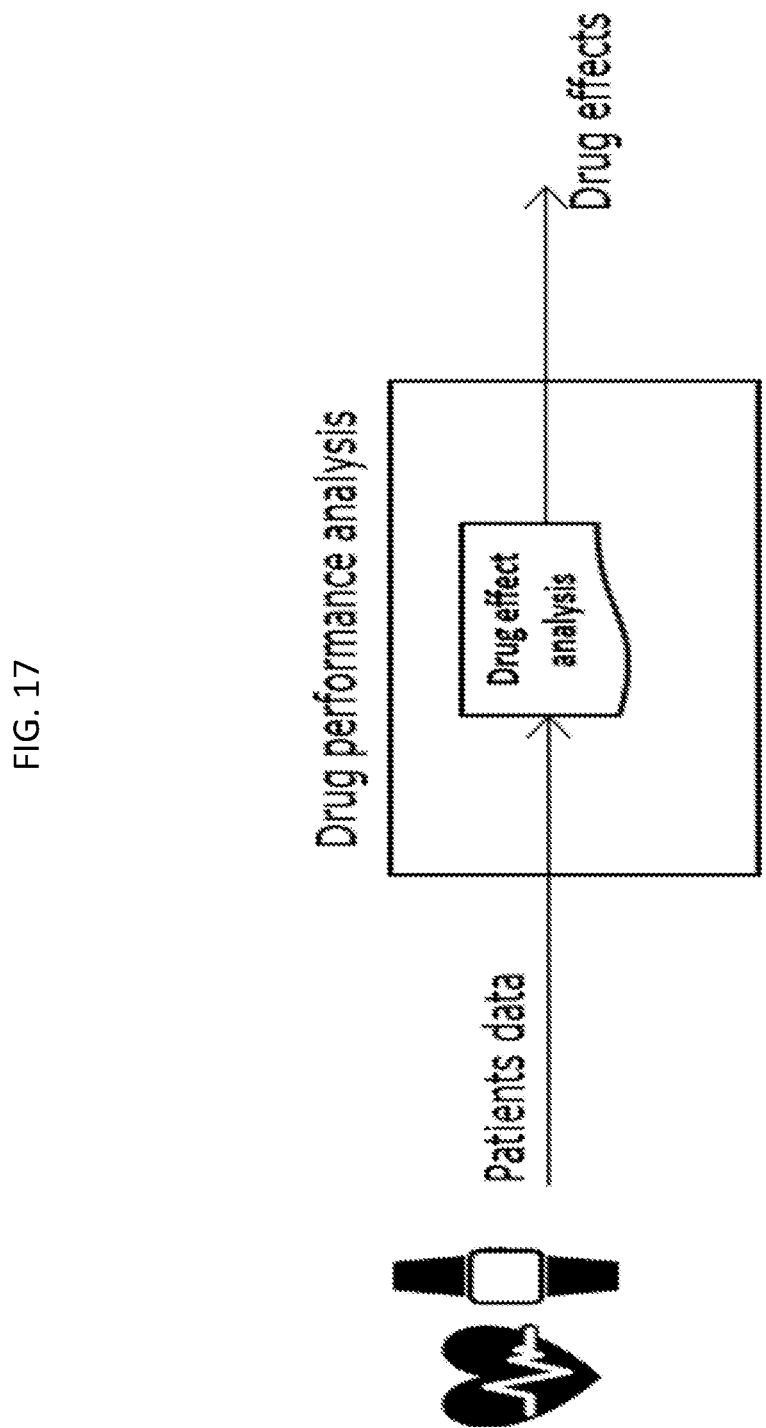
FIG. 17 shows a use case example related to drug performance, according to an embodiment.
Figure 18:
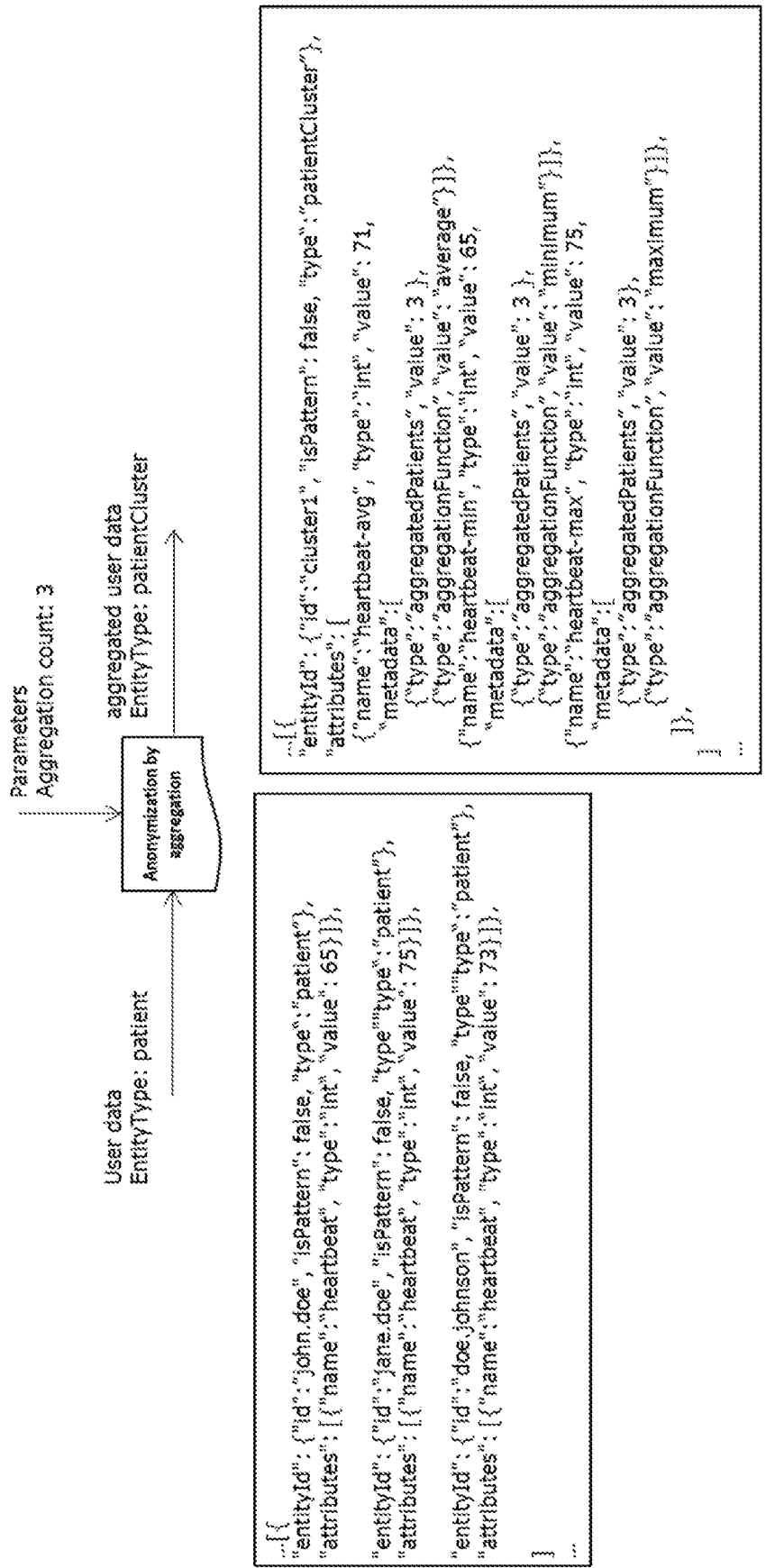
FIG. 18 shows an anonymization function according to an embodiment.

In another embodiment, a healthcare scenario is provided where patients are monitored at home and a pharmaceutical company is interested to analyze the effect of a new drug. The service is made of one analytics task that takes as input the patients data as shown in FIG. 17 and outputs possible drug effects. The patients may wish to participate in the experiment, but they do not want to share personal information together with medical parameters. Therefore, they want to have data aggregated before having it used (e.g., aggregated at least by three patients), such as by using the function as shown in FIG. 18.

The user, hence, may set a policy such as the following:
Who: homeland security
What: entityType:user
To whom: public transportation company
Purpose: fleet schedule optimizer
Constraints: {Action: username anonymization function;
    Parameter: aggregationCount>=3}

Such policy can be translated in Open Digital Rights Language (ODRL) as the following:

```
... .
    "uid": "http://example.com/policy:66",
    "permission": [{
        ... .,
        "target": "entityType:patient",
        "action": "use",
        "duty": [{
            "action": [{
                "rdf:value": { "@id": "preprocess" },
                "refinement": [{
                    "leftOperand": "useFunction",
                    "operator": "eq",
                    "rightOperand":
                        "anonymizationByAggregation"
                },{
                    "leftOperand": "aggregationCount",
                    "operator": "ge",
                    "rightOperand": "3"
                }]]
        }]
... .
```

Figure 19:
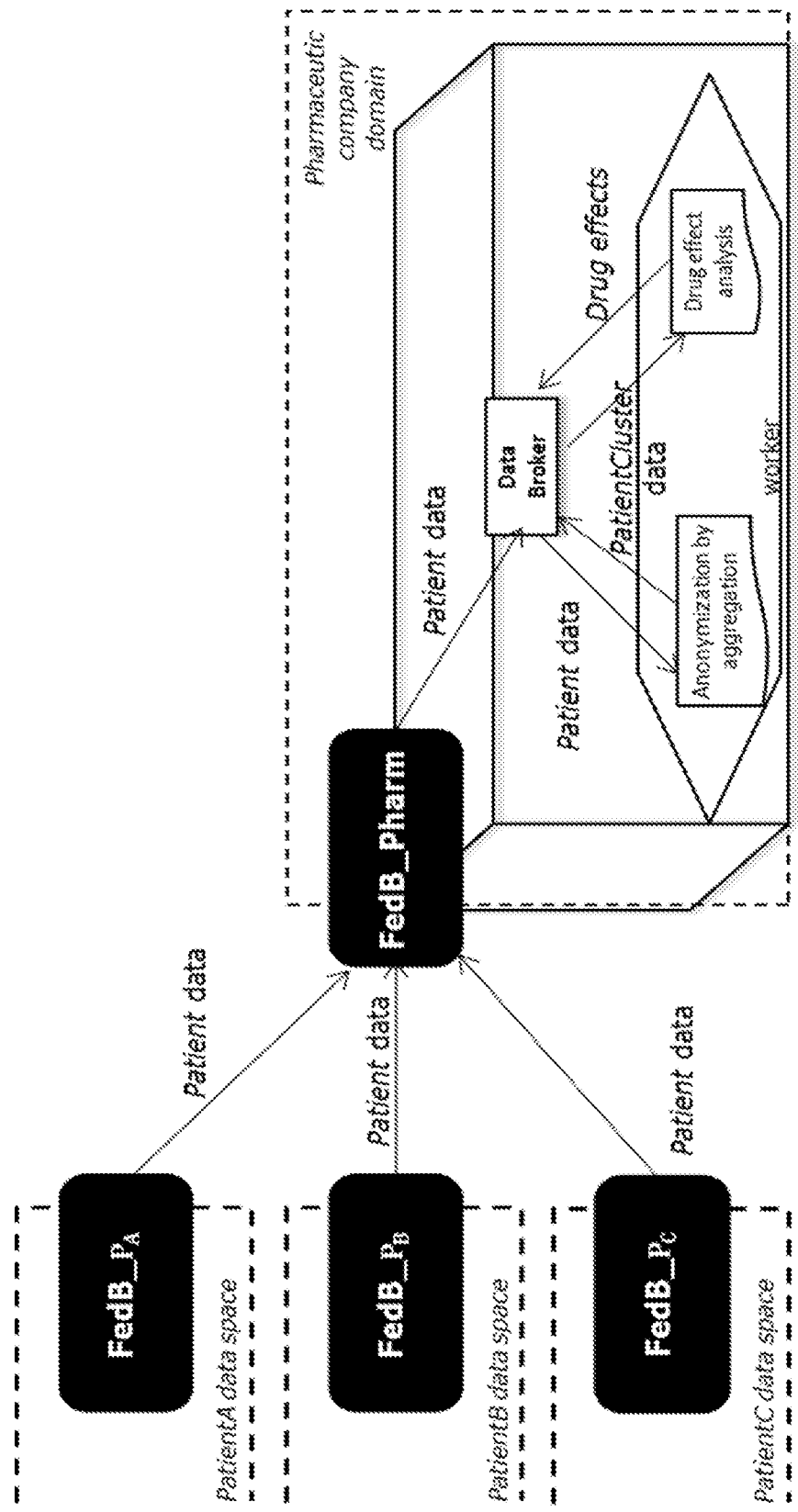
FIG. 19 illustrates receipt of patient controlled data from multiple patient data spaces by a company domain, according to an embodiment.

Similar to the previous embodiments, the system is brokering the data towards the execution environment of the pharmaceutic company domain, but it forces the pre-processing of the data through the anonymizationByAggregation function passing the aggregation parameters (i.e., at least 3 patients to be aggregated) as directive to the worker as shown in FIG. 19. The output of the pre-processing function is, then, forwarded to the drug effect analysis task that issues the analysis to the pharmaceutic company.

In this embodiment, each of the patients has power or control over their own personal domain as a "personal data space". This can be accomplished, in an embodiment, by a hardware gateway that is placed within the domestic premises of the patient. In another embodiment, a cloud provider offers the personal data space as a cloud service.

In another embodiment, the patients belong to a single domain (e.g., a local healthcare public agency), and the latter may interact as a one of the system party with the pharmaceutic company domain.

FIG. 20 is a block diagram of a processing system 2000 according to an embodiment. The processing system 2000 can be used to implement the protocols, devices, mechanisms, systems and methods described above. For example, each node of an entity domain may include processing system 2000, e.g., a data broker node or component, a worker node or component, a data consumer node or component, a data provider node or component a local access control node or component, a federation broker node or component, a data usage policy manager node or component, etc. The processing system 2000 includes a processor 2004, such as a central processing unit (CPU) of a computing device or a distributed processor system. The processor 2004 executes processor-executable instructions for performing the functions and methods described above. In embodiments, the processor executable instructions are locally stored or remotely stored and accessed from a non-transitory computer readable medium, such as storage 2010, which may be a hard drive, cloud storage, flash drive, etc. Read Only Memory (ROM) 2006 includes processor-executable instructions for initializing the processor 2004, while the random-access memory (RAM) 2008 is the main memory for loading and processing instructions executed by the processor 2004. The network interface 2012 may connect to a wired network or cellular network and to a local area network or wide area network, such as the Internet, and may be used to receive and/or transmit data, including datasets such as instantiation requests or instructions, analytics task(s), datasets representing requested data or data streams acting as input data or output data, etc. In certain embodiments, multiple processors perform the functions of processor 2004.

Embodiments herein advantageously enable specification of a policy model for expressing data usage constraints. Embodiments herein advantageously enable interpretation of policies resulting into a translation of atomic actions to be executed. The actions enforce runtime control of data usage policies on a federated environment by allowing the usage of data only where allowed, only by an allowed federation party or parties, and only with the conditions described by the data owner. Embodiments herein also advantageously enable execution of atomic actions by changing the data consuming service to include pre- and post-processing functions, by instructing computing nodes to instantiate analytics tasks and pre-/post-processing functions with runtime directives, by dispatching analytics tasks and pre-/post-processing functions into the federation for remote execution.

Data control methods herein include some or all of the following: 1) submission of, or receipt of: a) data availability registration and the data usage policies by a data owner, b) a data consuming application in the form of one or more analytics tasks created by a data consumer; 2) continuously checking the availability of data input needed by data consuming applications for tasks or each of the atomic analytics functions or tasks; 3) interpreting data usage policies for the available data needed by a task resulting in a list of atomic actions; 4) executing the computed atomic actions by changing the data consuming service to include pre- and post-processing functions, by instructing computing nodes to instantiate analytics tasks and pre-/post-processing functions with runtime directives, by dispatching analytics tasks and pre-/post-processing functions into the federation for remote execution; and 5) establishing data flows among data providers and data consuming applications, by way of data subscription through data brokers.

Embodiments herein advantageously enable control of data usage of runtime environments with streaming data in a de-centralized system handled by federated administration domains. The data access and data usage policies include the input for the orchestration of data flows and data processing among computing nodes handled by separate administration domains.

While embodiments have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method of controlling data usage in a distributed environment among multiple entity domains, the method comprising the steps of:
   receiving, in a local entity domain, a data consuming application comprising or identifying at least a first analytics task, wherein the first analytics task processes one or more data inputs to produce first output data;
   determining availability of the one or more data inputs;
   interpreting one or more data usage policies to determine atomic actions to be executed, wherein at least one of the data usage policies indicates that one of the data inputs for the first analytics task must remain in a remote entity domain, wherein the remote entity domain is selected based on the determined availability of the one or more data inputs; and
   executing the atomic actions, wherein the atomic actions include dispatching the first analytics task to the remote entity domain for remote execution of the first analytics task and receiving the first output data of the first analytics task from the remote entity domain.

2. The method of claim 1, wherein the executing the atomic actions further includes modifying the data consuming application to include one or more pre-processing functions or tasks and/or one or more post-processing functions or tasks; and instructing one or more computing nodes in the local entity domain to instantiate the one or more pre-processing functions or tasks and/or one or more post-processing functions or tasks with runtime directives.

3. The method of claim 1, wherein the data analytics application includes a second analytics task, and wherein the second analytics task processes, in the local entity domain, at least the first output data of the first analytics task received from the remote entity domain to produce second output data.

4. The method of claim 1, wherein each of the multiple entity domains includes a trusted environment entity configured with:
   a master node configured to perform the step of interpreting the one or more data usage policies to determine the atomic actions to be executed, and steps of instantiating an analytics task locally or dispatching data and/or an analytics task to remote entities according to the one or more data usage policies;

a data broker node configured to establish a connection with a data broker node of a remote entity domain to dispatch, to the remote entity domain, the data and/or analytics task as dynamically configured by the master node; and one or more computation nodes, each configured to instantiate one or more analytics tasks locally.

5. The method of claim 4, wherein each of the multiple entity domains includes a federation broker entity configured to communicate with the other federation broker entities, to establish the connections with data broker nodes of different entity domains for the local data broker node and procure data from outside the local entity domain on behalf of the local master node.

6. The method of claim 1, further including retrieving or accessing the one or more data usage policies from a policies management component or node.

7. The method of claim 6, wherein the policies management component or node is a centralized component separate from the local entity domain.

8. The method of claim 6, wherein the policies management component or node is a distributed component and includes a portion accessible locally to the local entity domain.

9. The method of claim 1, wherein the data usage policies monitor the use of the data inputs.

10. A method of controlling data usage in a distributed environment among multiple entity domains, the method comprising the steps of:

receiving, in a local entity domain, an instruction to instantiate a first analytics task, wherein the first analytics task processes one or more data inputs to produce first output data, the first analytics task having been dispatched to the local entity domain by a remote entity domain based on an interpretation of a data usage policy created in the local entity domain indicating that one of the data inputs for the first analytics task must remain in the local entity domain;

instantiating the first analytics task in the local entity domain; and executing the first analytics task in the local entity domain to produce the first output data; and sending the first output data to the remote entity domain.

11. The method of claim 7, further including receiving, from a local data provider, a policy model including the data usage policy, wherein the data usage policy identifies data usage constraints for data provided by the local data provider.

12. The method of claim 11, further including storing the one or more data usage policies to a policies management component or node, wherein the policies management component or node is a centralized component separate from the local entity domain; or the policies management component or node is a distributed component and includes a portion accessible locally to the local entity domain.

13. A data usage control system, comprising:
a first entity domain comprising a first trusted environment entity; and
a second entity domain comprising a second trusted environment entity;

wherein the first trusted environment entity is configured to:
receive, from a first data consumer associated in the first entity domain, a data consuming application comprising or identifying at least a first analytics task, wherein the first analytics task processes one or more data inputs to produce first output data;
determine availability of the one or more data inputs;
interpret one or more data usage policies to determine atomic actions to be executed, wherein at least one of the data usage policies indicates that one of the data inputs for the first analytics task must remain in the second entity domain, wherein the second entity domain is selected based on the determined availability of the one or more data inputs; and
execute the atomic actions, wherein the atomic actions include dispatching the first analytics task to the second entity domain for remote execution of the first analytics task and receiving the first output data of the first analytics task from the second entity domain.

14. The data usage control system according to claim 13, wherein each of the first trusted environment entity and the second trusted environment entity includes:
a master node configured to interpret the one or more data usage policies to determine the atomic actions to be executed, and instantiate an analytics task locally or dispatch data and/or an analytics task to the other entity domain according to the one or more data usage policies;
a data broker node configured to establish a connection with a data broker node of the other entity domain to dispatch, to the other entity domain, the data and/or analytics task as dynamically configured by the master node; and
one or more computation nodes, each configured to instantiate one or more analytics tasks locally.

15. The data usage control system according to claim 14, wherein each of the first trusted environment entity and the second trusted environment entity includes a federation broker entity configured to communicate with the other federation broker entity, to establish the connections with the data broker node of the other entity domain for the local data broker node and procure data from the other entity domain on behalf of the local master node.

16. A data usage control system according to claim 13, comprising a policies management component or node, wherein
the policies management component or node is a centralized component separate from the first entity domain and the second entity domain; or
the policies management component or node is a distributed component and includes a portion accessible locally to each of the first entity domain and the second entity domain.

17. The data usage control system according to claim 13, wherein the second trusted environment entity is configured to:
receive from the first entity domain a request to instantiate the first analytics task;
instantiate the first analytics task;
execute the first analytics task to produce the first output data; and
send the first output data to the first entity domain.

* * * * *